(12) United States Patent     (10) Patent No.: US 12,566,782 B1
Verrier     (45) Date of Patent: Mar. 3, 2026

(54) TOPIC MAPS FOR CONSTRAINED RETRIEVAL AUGMENTED GENERATION

(71) Applicant: Oracle International Corporation, Redwood Shores, CA (US)

(72) Inventor: Jean-Francois Verrier, Rognes (FR)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/891,244

(22) Filed: Sep. 20, 2024

Related U.S. Application Data

(60) Provisional application No. 63/688,955, filed on Aug. 30, 2024.

(51) Int. Cl.
G06F 16/28 (2019.01)
G06F 16/2457 (2019.01)

(52) U.S. Cl.
CPC ...... G06F 16/285 (2019.01); G06F 16/24578 (2019.01)

(58) Field of Classification Search
CPC .......................... G06F 16/24578; G06F 16/285
See application file for complete search history.

(56) References Cited

U.S. PATENT DOCUMENTS

2010/0153094 A1* 6/2010 Lee ..................... G06F 16/3329
704/9

OTHER PUBLICATIONS

Zhang, Duo, et al. "PTM: Probabilistic topic mapping model for mining parallel document collections." Proceedings of the 19th ACM international conference on Information and knowledge management. 2010. (Year: 2010).*

* cited by examiner

*Primary Examiner* — Jay A Morrison
(74) *Attorney, Agent, or Firm* — Invoke

(57)     ABSTRACT

Current generative AI systems using large language models (LLMs) face challenges including non-deterministic outputs, hallucinations, outdated information, and resource-intensive training. This disclosure introduces topic maps for constrained retrieval augmented generation to address these issues. The technique leverages existing LLMs while constraining outputs to specific, user-defined content domains. Topic maps, composed of topic names, descriptions, and relevant resource references, create a curated knowledge base that guides agent responses. This approach reduces hallucinations, improves consistency, and allows for dynamic updates without model retraining. The method involves receiving a query, identifying relevant topic maps, transmitting the query and references to an AI agent, and generating constrained responses. By providing a structured, updatable knowledge framework, this method enhances the accuracy, reliability, and adaptability of generative AI systems.

20 Claims, 13 Drawing Sheets

PARSE THE TABLE OF CONTENTS. 202

CREATE INITIAL TOPIC MAPS FROM THE PARSED TABLE OF CONTENTS. 204

ENRICH THE INITIAL TOPIC MAPS. 206

HANDLE NESTED TOPICS IN THE ENRICHED TOPIC MAPS. 208

GENERATE CONTENT SUMMARIES FOR THE ENRICHED TOPIC MAPS. 210

UPDATE THE ENRICHED TOPIC MAPS WITH TEXT SUMMARIES AND VECTORIZED SUMMARIES. 212

IDENTIFY RELATED TOPICS. 214

FINALIZE THE ENRICHED TOPIC MAPS. 216

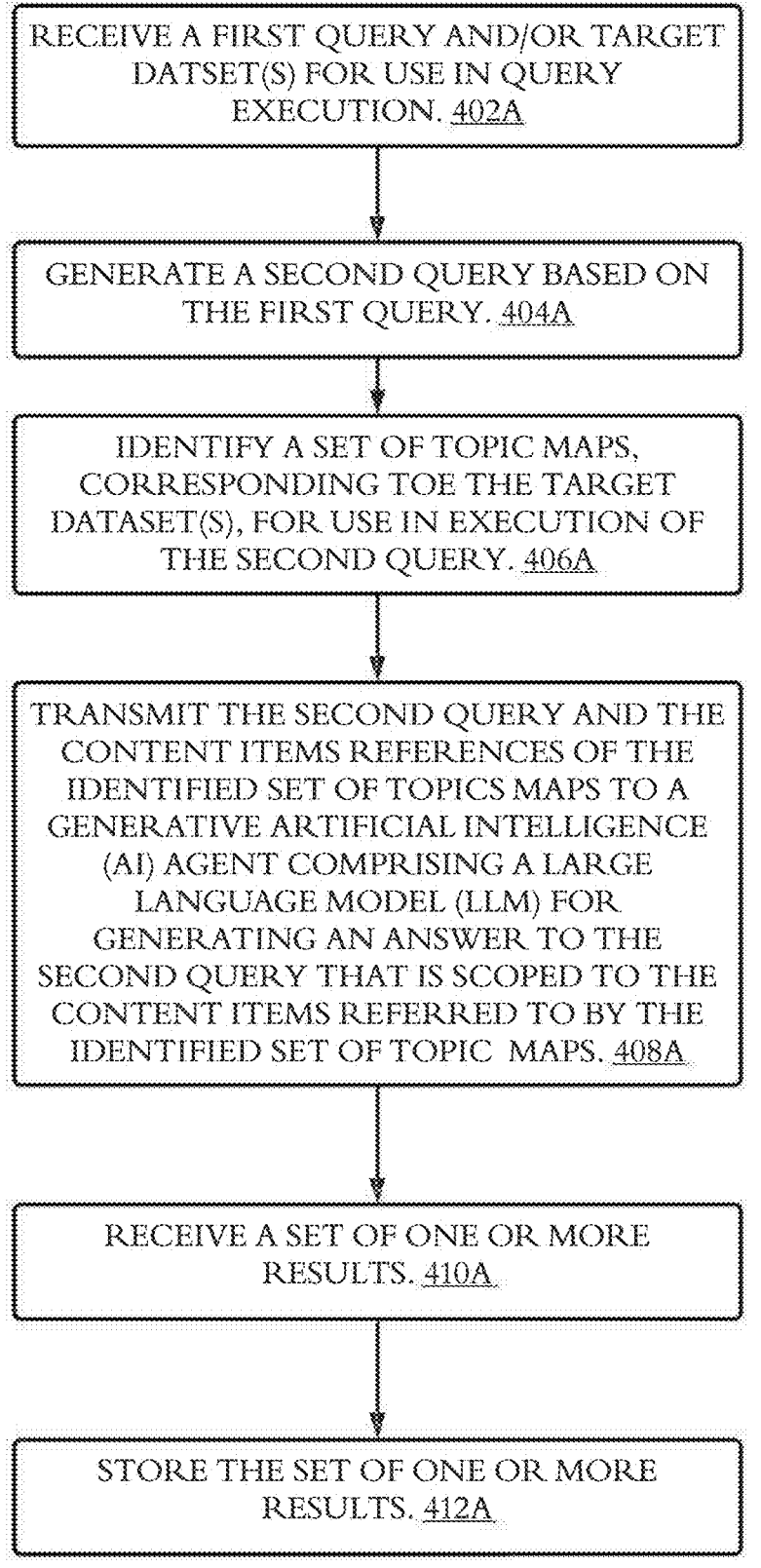

RECEIVE A FIRST QUERY AND/OR TARGET DATSET(S) FOR USE IN QUERY EXECUTION. 402A

GENERATE A SECOND QUERY BASED ON THE FIRST QUERY. 404A

IDENTIFY A SET OF TOPIC MAPS, CORRESPONDING TOE THE TARGET DATASET(S), FOR USE IN EXECUTION OF THE SECOND QUERY. 406A

TRANSMIT THE SECOND QUERY AND THE CONTENT ITEMS REFERENCES OF THE IDENTIFIED SET OF TOPICS MAPS TO A GENERATIVE ARTIFICIAL INTELLIGENCE (AI) AGENT COMPRISING A LARGE LANGUAGE MODEL (LLM) FOR GENERATING AN ANSWER TO THE SECOND QUERY THAT IS SCOPED TO THE CONTENT ITEMS REFERRED TO BY THE IDENTIFIED SET OF TOPIC MAPS. 408A

RECEIVE A SET OF ONE OR MORE RESULTS. 410A

STORE THE SET OF ONE OR MORE RESULTS. 412A

FIG. 4A

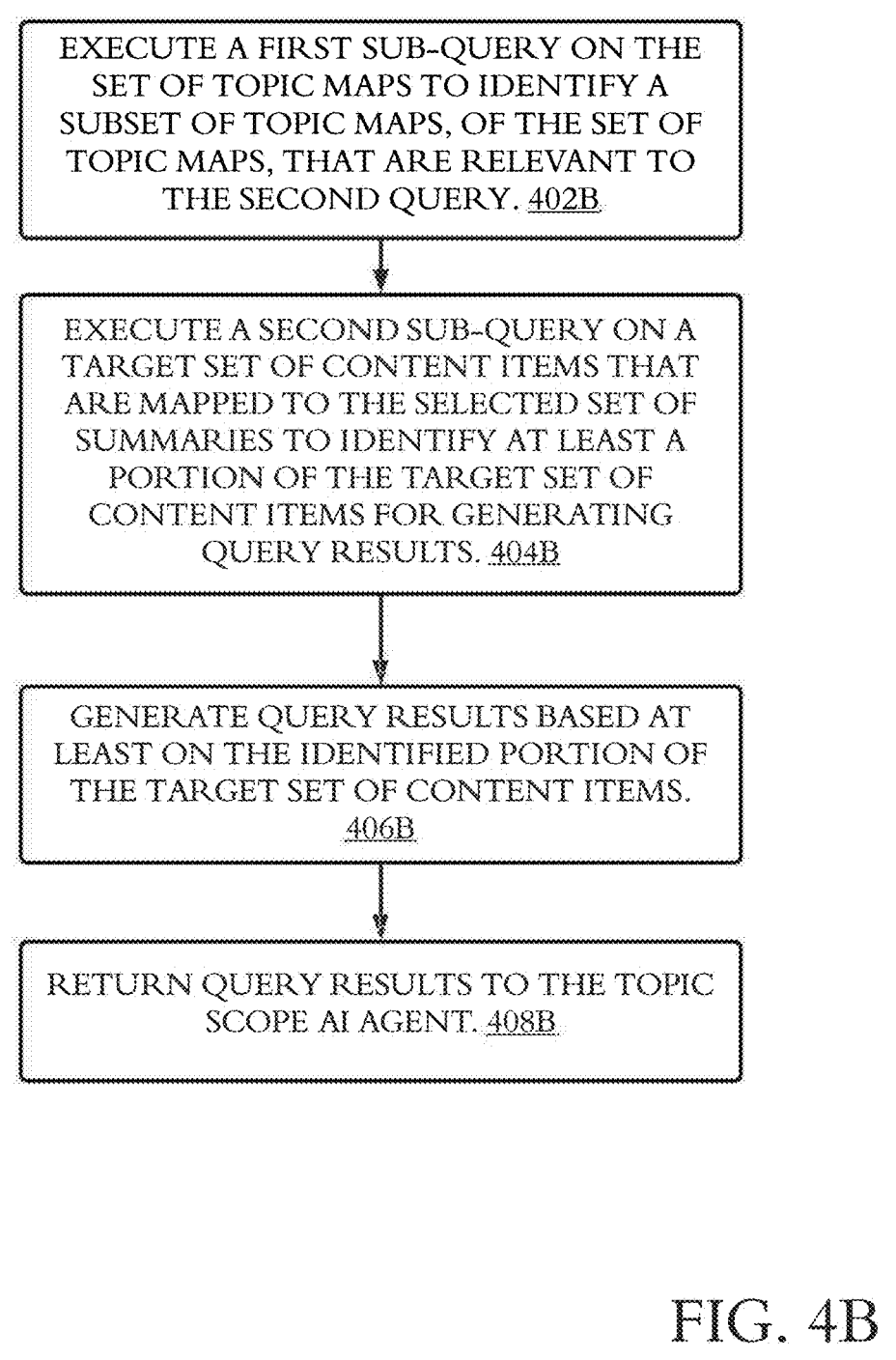

EXECUTE A FIRST SUB-QUERY ON THE SET OF TOPIC MAPS TO IDENTIFY A SUBSET OF TOPIC MAPS, OF THE SET OF TOPIC MAPS, THAT ARE RELEVANT TO THE SECOND QUERY. 402B

EXECUTE A SECOND SUB-QUERY ON A TARGET SET OF CONTENT ITEMS THAT ARE MAPPED TO THE SELECTED SET OF SUMMARIES TO IDENTIFY AT LEAST A PORTION OF THE TARGET SET OF CONTENT ITEMS FOR GENERATING QUERY RESULTS. 404B

GENERATE QUERY RESULTS BASED AT LEAST ON THE IDENTIFIED PORTION OF THE TARGET SET OF CONTENT ITEMS. 406B

RETURN QUERY RESULTS TO THE TOPIC SCOPE AI AGENT. 408B

FIG. 4B

PROMPT 500

QUERY CONTEXT 502

INSTRUCTION ON CONSTRAINT LEVEL 504

REFERENCED CONTENT 506

TASK SPECIFICATION 508

FIG. 5

PROMPT
600

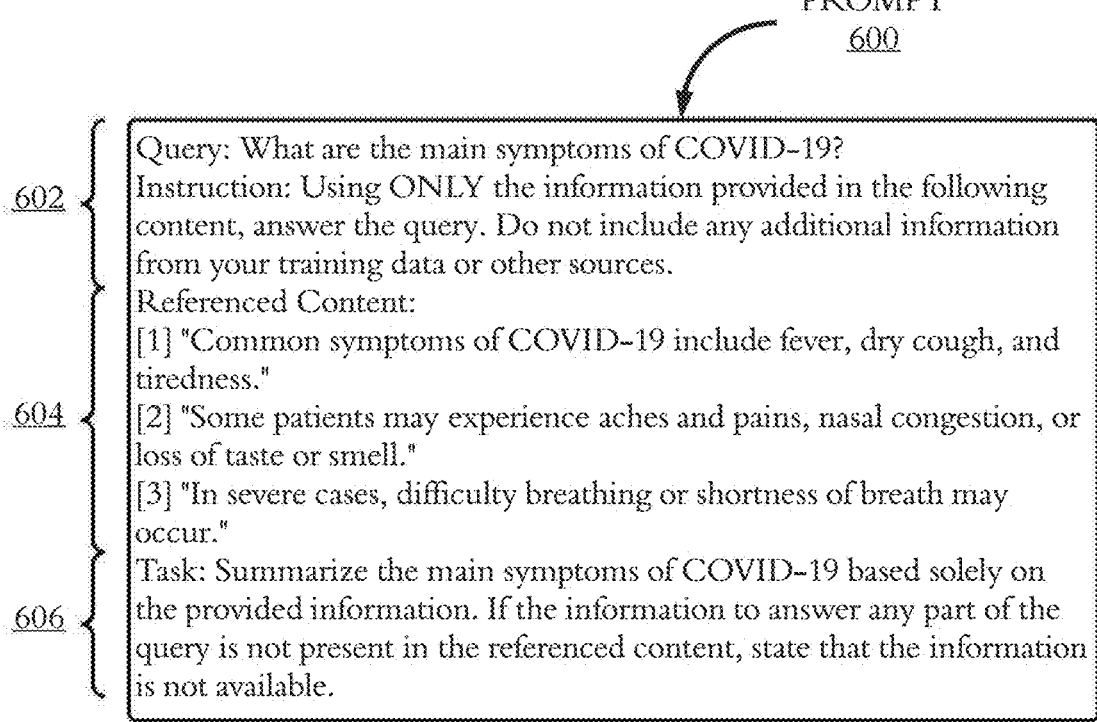

602 { Query: What are the main symptoms of COVID-19?
Instruction: Using ONLY the information provided in the following content, answer the query. Do not include any additional information from your training data or other sources.

604 { Referenced Content:
[1] "Common symptoms of COVID-19 include fever, dry cough, and tiredness."
[2] "Some patients may experience aches and pains, nasal congestion, or loss of taste or smell."
[3] "In severe cases, difficulty breathing or shortness of breath may occur."

606 { Task: Summarize the main symptoms of COVID-19 based solely on the provided information. If the information to answer any part of the query is not present in the referenced content, state that the information is not available.

FIG. 6

PROMPT
700

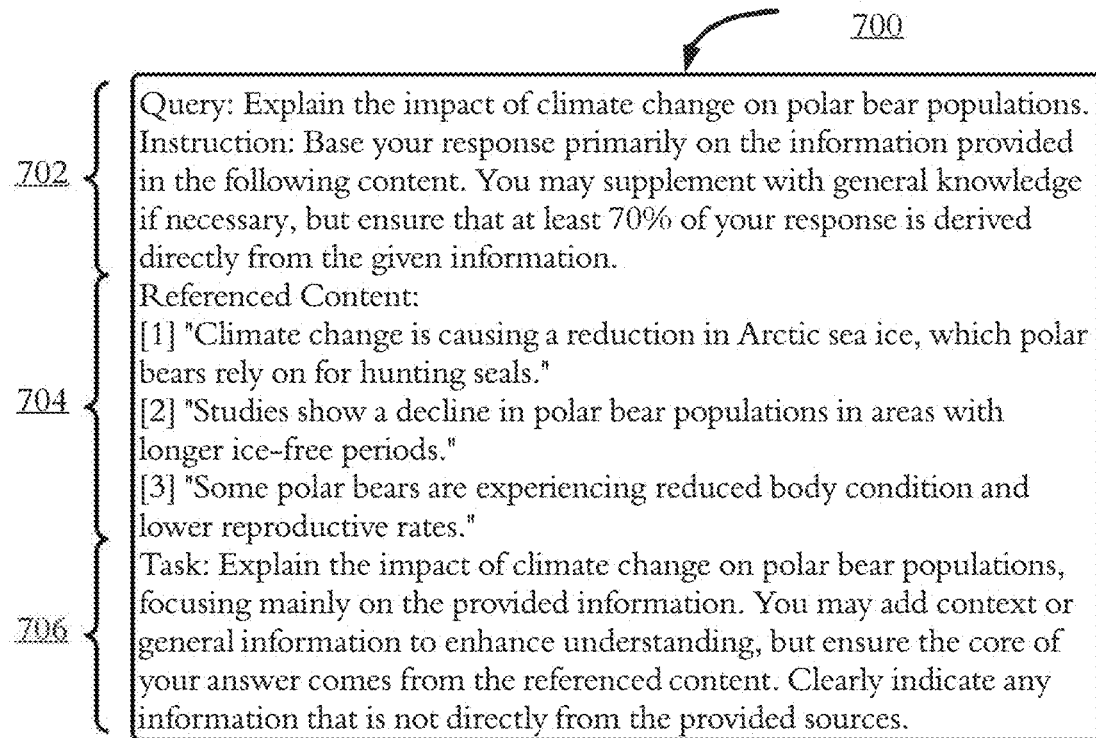

702 { Query: Explain the impact of climate change on polar bear populations. Instruction: Base your response primarily on the information provided in the following content. You may supplement with general knowledge if necessary, but ensure that at least 70% of your response is derived directly from the given information.

704 { Referenced Content:
[1] "Climate change is causing a reduction in Arctic sea ice, which polar bears rely on for hunting seals."
[2] "Studies show a decline in polar bear populations in areas with longer ice-free periods."
[3] "Some polar bears are experiencing reduced body condition and lower reproductive rates."

706 { Task: Explain the impact of climate change on polar bear populations, focusing mainly on the provided information. You may add context or general information to enhance understanding, but ensure the core of your answer comes from the referenced content. Clearly indicate any information that is not directly from the provided sources.

FIG. 7

PROMPT
TEMPLATE
900

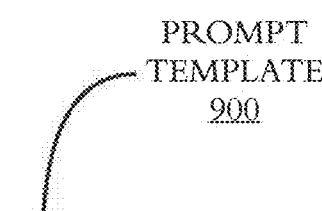

Query: [User's query]
Instruction: Based on the following summaries related to [Topic],
provide an answer to the query. Use only the information contained in
these summaries.
Content Summaries:
1. "[Brief summary of content item 1]"
2. "[Brief summary of content item 2]"
3. "[Brief summary of content item 3]"
Task: Synthesize the information from these summaries to answer the
query. If the summaries do not contain sufficient information to fully
answer the query, state so explicitly.

FIG. 9

TOPIC MAP
DATA
STRUCTURE
FORMAT 1000

```
{
 "topic": "Example Topic",
 "content_items": [
   {
     "reference": "Content1_ID" (or "summary": "Content summary..."),
     "relevance_score": 0.95
   },
   {
     "reference": "Content2_ID" (or "summary": "Another summary..."),
     "relevance_score": 0.82
   },
   ...
 ]
}
```

FIG. 10

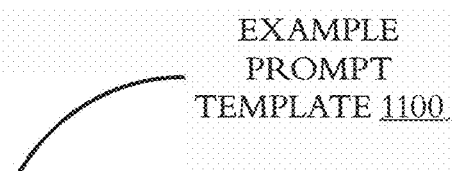

EXAMPLE PROMPT TEMPLATE 1100

Query: [User's query]
Instruction: Generate an answer based on the following content items, prioritizing those with higher relevance scores. Pay particular attention to content with scores above 0.8.
Content Items (ordered by relevance):
1. (Score: 0.95) [Reference or summary of most relevant content]
2. (Score: 0.88) [Reference or summary of next most relevant content]
3. (Score: 0.75) [Reference or summary of less relevant content]
...
Task: Synthesize an answer to the query, giving more weight to higher-scored content. Clearly indicate if you're using information from lower-scored items.

FIG. 11

TOPIC MAPS FOR CONSTRAINED RETRIEVAL AUGMENTED GENERATION

INCORPORATION BY REFERENCE; DISCLAIMER

The following application is hereby incorporated by reference: application No. 63/688,955 filed Aug. 30, 2024. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to generative artificial intelligence (AI) agents and retrieval augmented generation therefor.

BACKGROUND

Generative artificial intelligence (AI) agents are conversational systems powered by large language models (LLMs) trained on vast amounts of text data. These models, sometimes based on transformer architectures, use self-attention mechanisms and deep neural networks to generate human-like responses to user inputs. They operate by predicting the most likely sequence of tokens given a prompt, leveraging patterns learned from their training data. While powerful, these systems often struggle with up-to-date information, factual accuracy, and consistency across interactions due to their reliance on static, pre-trained knowledge.

Retrieval Augmented Generation (RAG) is an advanced natural language processing (NLP) technique that combines information retrieval with text generation to produce more accurate and contextually relevant outputs. This approach enhances LLMs by incorporating external knowledge sources during the generation process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

One or more embodiments of the present disclosure are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4A is a flowchart of a first process for topic maps for constrained retrieval augmented generation according to an embodiment of the present disclosure;

FIG. 4B is a flowchart of a second process for topic maps for constrained retrieval augmented generation according to an embodiment of the present disclosure;

FIG. 5 illustrates an example structure of an LLM prompt that is transmitted from a topic scope AI agent to a generative AI agent according to an embodiment of the present disclosure;

FIG. 6 illustrates an example LLM prompt that imposes a strict constraint level on a generative AI agent according to an embodiment of the present disclosure;

FIG. 7 illustrates an example LLM prompt that substantially or mostly constrains a generative AI model to provided content according to an embodiment of the present disclosure;

FIG. 9 illustrates an example LLM prompt template that uses content item summaries instead of content item references according to an embodiment of the present disclosure;

FIG. 10 illustrates an example data structure format for representing topic maps in a topic vault according to an embodiment of the present disclosure;

FIG. 11 illustrates an example prompt template that incorporates content item relevance scores according to an embodiment of the present disclosure.

DETAILED DESCRIPTION

Figure 1:
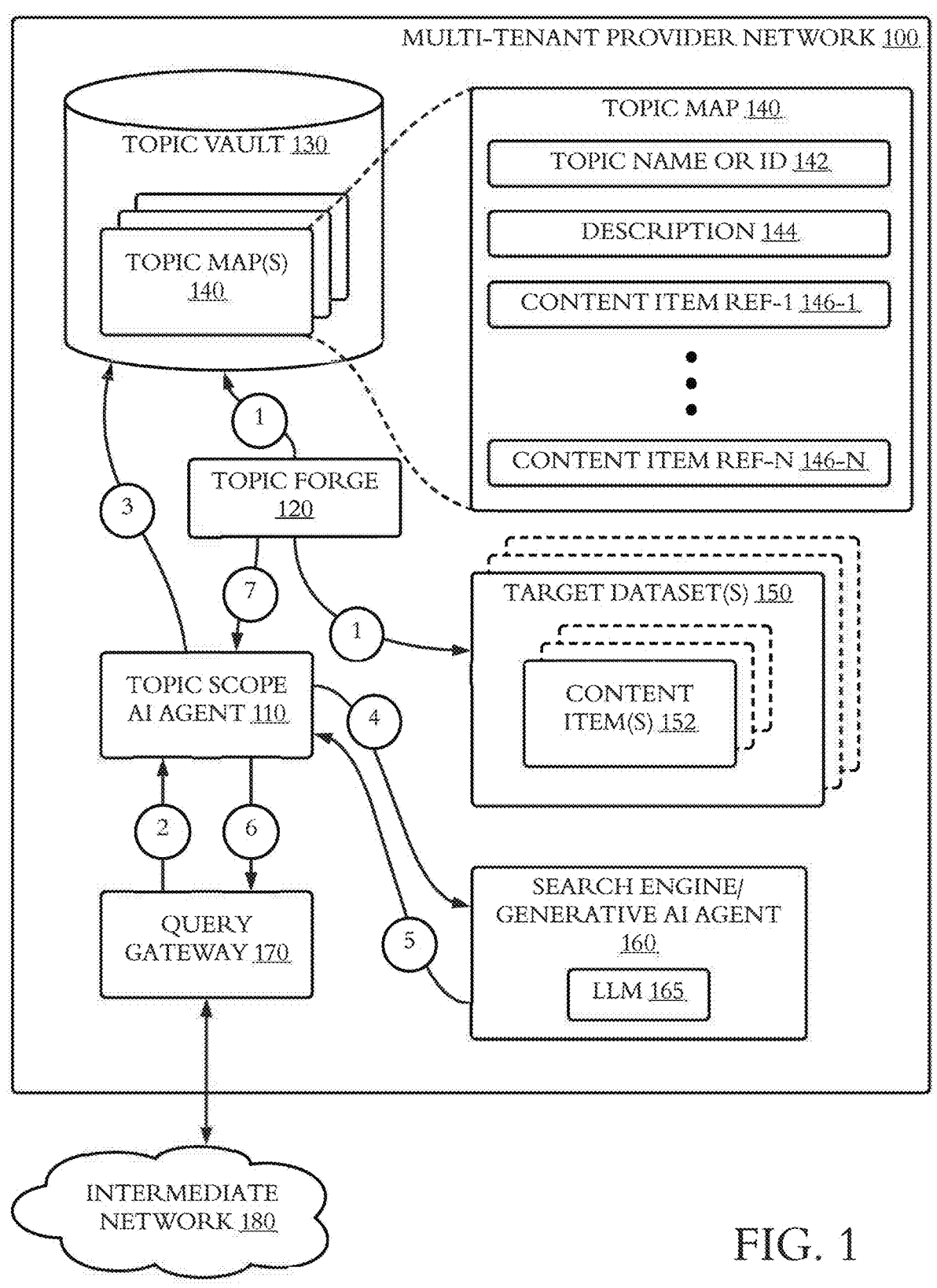
FIG. 1 illustrates an example multi-tenant provider network environment in which techniques for topic maps for constrained retrieval augmented generation are implemented according to an embodiment of the present disclosure.

In the following detailed description, for the purposes of explanation, numerous specific details are set forth to aid understanding of one or more embodiments of the present disclosure. In some instances, an embodiment of the present disclosure may be practiced without one or more of these specific details. In some cases, a described feature of one embodiment of the present disclosure is also a feature of one or more other embodiments of the present disclosure even though the feature is not expressly described with respect to the one or more other embodiments. In some embodiments, well-known structures and devices are shown in the figures in block diagram form to avoid unnecessarily obscuring the embodiment.

1. INTRODUCTION
2. GENERAL OVERVIEW
3. MULTI-TENANT PROVIDER NETWORK ENVIRONMENT
   3.1 TOPIC SCOPE AI AGENT
   3.2 TOPIC FORGE
   3.3 TOPIC VAULT
   3.4 TOPIC MAPS
   3.5 GENERATIVE AI AGENT
4. METHOD FOR TOPIC MAPS FOR CONSTRAINED RETRIEVAL AUGMENTED GENERATION
5. GUI EXAMPLE
6. TOPIC MAPS WITH CONTENT ITEM SUMMARIES
7. CONTENT ITEM RELEVANCE RANKING/SCORING
8. EXTENSIONS AND ALTERNATIVES

9. HARDWARE OVERVIEW

10. TERMINOLOGY

1. Introduction

There are technical challenges in current generative artificial intelligence (AI) agent systems that use large language models (LLMs) to generate text. First, the issue of non-deterministic outputs stems from the stochastic nature of language model decoding, where different random seeds or sampling methods can lead to varying responses. This lack of consistency poses problems for reproducibility and reliability in applications requiring stable outputs. The hallucination problem arises from an LLM's tendency to generate plausible sounding but factually incorrect information, especially when dealing with queries beyond their training data or requiring up-to-date knowledge.

The challenge of incorporating new information is rooted in the static nature of an LLM's pre-trained knowledge. Once trained, these models cannot easily assimilate new data without undergoing resource-intensive fine-tuning or retraining processes that typically occur infrequently due to computational costs. This results in a significant lag between the emergence of new information and its integration into the model's knowledge base.

Lastly, the resource intensiveness of building or fine-tuning LLMs presents a substantial barrier to entry. The computational requirements for training large-scale models, including high-performance hardware, extensive datasets, and significant energy consumption, make it impractical for many organizations or individuals to develop custom solutions or adapt existing models to specific domains or up-to-date information.

These issues collectively point to the limitations of relying solely on pre-trained LLMs for agent applications, especially in contexts requiring consistency, factual accuracy, and up-to-date information.

2. General Overview

One or more embodiments use topic maps for the execution of a query to improve performance and/or scope the query results on a particular target dataset(s). A topic map includes a particular topic, a reference(s) to a content item(s) associated with the particular topic. A topic map may further include a description of the content item(s) referenced in the topic map. A collection of topic maps may be referred to herein as an "information map."

Initially, one or more embodiments receive a query and/or an identification of a target dataset(s) upon which the query is to be executed. Furthermore, one or more embodiments determine a target dataset(s) based on attributes of the query such as, for example, a source of the query, the time the query was received, an entity associated with the query, etc. Alternatively, or additionally, one or more embodiments determine a target dataset(s) based on a stored configuration.

Subsequent to identifying the target dataset(s), one or more embodiments determine a set of topic maps for the target dataset. One or more embodiments pre-compute the topic map for the target dataset and store the pre-computed topic map for use in a subsequently initiated query. Alternatively, or additionally, one or more embodiments compute the topic map, at runtime, in response to receiving the query and/or the target dataset(s).

One or more embodiments return the topic maps to a user to enable to user to submit the topic maps with the query to a search engine. Alternatively, or additionally, one or more embodiments directly submit the topic maps with the query to the search engine to generate query results that are scoped to the content items referenced by the topic maps. One or more embodiments submit, to the search engine, (a) the same query that was received by the system, (b) a modified version of the query that was received by the system, and/or (c) a query that is based at least in part on the query that was received by the system.

In one or more embodiments, a search engine receives the query with the set of topic maps. The search engine selects a subset of topic maps from the received set of topic maps. Selecting the subset of topic maps includes selecting one or more topic maps, from the received set of topic maps, that include topics relevant to the query. Alternatively, or additionally, the search engine in one or more embodiments selects one or more topic maps, from the received set of topic maps, that include content item descriptions that are relevant to the query.

In one or more embodiments, the search engine determines search results based on a target set of content item(s) referenced in the selected subset of topic maps. The search engine in one or more embodiments refrains from determining search results based on content item(s) that have not been referenced by at least one of the selected subset of topic maps. In an example, the search engine generates vector embedding(s) for the target set of content item(s) and vector embedding(s) for the query received by the search engine. Based on a comparison of the vector embedding(s) for the target set of content items and the vector embedding(s) for the query, one or more embodiments select at least a portion of the target set of content items to generate query results. The search engine may include a generative artificial intelligence (AI) agent system that uses a large language model (LLM) to generate text. The search engine may generate the query results by composing an answer to the query based on the selected portion of the target set of content items. This constrained approach aims to reduce hallucinations and improve response consistency by limiting the model's knowledge base to curated, relevant information. The search engine returns the query results to the system.

As described above, the search engine in one or more embodiments determines query results based on content items referenced by at least one of the selected subset of the topic maps. In order to determine the query results, the search engine in one or more embodiments executes a first sub-query on the received set of topic maps to identify the subset of topic maps with topics and/or content item descriptions that are relevant to the query. Furthermore, the search engine in one or more embodiments executes a second sub-query on a target set of content items referenced by at least one of the subset of topic maps to identify at least a portion of the target set of content items. Finally, the search engine in one or more embodiments generates the query results based at least on the portion of the target set of content items.

By executing the second sub-query on the target set of content items referenced by at least one of the selected subset of topic maps, rather than on all content items, the efficiency of the search engine is greatly improved. One or more embodiments provide significant advantages over conventional systems that (a) specify a target dataset(s) for a search engine to scope a query and (b) do not provide topic maps, corresponding to the target dataset(s), for the search engine to improve query execution.

As noted above, the search engine in one or more embodiments returns the query results to the system. One or more embodiments then store the received query results. One or more embodiments present the query results on an interface. In an example, one or more embodiments present the query results on an interface in response to receiving user input defining the initial query received. Alternatively, or additionally, one or more embodiments transmit the query results to another system.

By using topic maps as a guiding structure, one or more embodiments create a dynamic, curated knowledge base that can be updated without retraining the underlying language model. One or more embodiments address the challenge of incorporating new information by using topic maps directed to the new information. One or more embodiments ensure that the search engine's responses are up-to-date and relevant by using topic maps directed to up-to-date and relevant information. Additionally, the constrained nature of the retrieval process may help mitigate the issues of non-deterministic outputs and hallucinations by providing a clear, predefined scope for the AI agent's responses.

In an embodiment, the techniques encompass one or more non-transitory computer-readable media comprising computer-executable instructions that, when executed by one or more hardware processors, causes one or more electronic computing devices to perform the above method.

In an embodiment, the techniques encompass a system comprising a set of one or more hardware processors and a set of one or more non-transitory computer-readable media storing a set of computer-executable instructions that, when executed, cause the system to perform the above method.

Topic maps for constrained retrieval augmented generation will now be described with respect to the figures.

One or more embodiments described in this Specification and/or recited in the claims may not be included in the General Overview section.

3. Multi-Tenant Provider Network Environment

In an embodiment, the techniques for topic maps for constrained retrieval augmented generation are implemented in a multi-tenant provider network environment. FIG. 1 illustrates an example multi-tenant provider network environment in which the techniques are implemented, according to an embodiment of the present disclosure.

In an embodiment, a multi-tenant provider network 100 incorporating a topic scope AI agent 110 configured to perform the techniques for topic maps for constrained retrieval augmented generation is structured as a scalable cloud-based system designed to serve multiple clients (tenants) simultaneously. The network 100 uses distributed computing resources, load balancing, and data partitioning to ensure efficient performance and data isolation between tenants. The topic scope AI agent 110 interfaces with various microservices and data stores to execute the query processing and response generation workflow.

In an embodiment, the provider network 100 utilizes a containerized architecture, using a container orchestration service for orchestration to deploy and manage the topic scope AI agent 110 and its associated services. A distributed database system referred to as topic vault 130 stores the topic maps 140 and content item references 146, with data sharding implemented to segregate information by tenant. The network 100 employs a query gateway 170 to handle incoming queries and to implement authentication, rate limiting, and request routing. The gateway 170 directs queries to the appropriate instance of the topic scope AI agent 110 based on tenant identification and load distribution.

The query gateway 170 serves as an entry point for incoming queries in the multi-tenant provider network 100, acting as an intermediary between external clients and the internal components of the system, particularly the topic scope AI agent 110. The gateway 170 is designed to handle high-volume, concurrent requests from diverse sources, ensuring efficient and secure routing of queries to the appropriate processing components.

The query gateway 170 is connected to an intermediate network 180 that represents a broader network infrastructure that bridges external client networks and the provider network 100. For example, the intermediate network 180 could be implemented as a content delivery network (CDN), a virtual private network (VPN), or a specialized edge network designed to handle incoming traffic from various geographical locations and network topologies.

Upon receiving the query from the intermediate network 180, the query gateway 170 performs any of the following functions: loading balancing, authentication and authorization, rate limiting, request validation, tenant identification, request routing, protocol translation, logging and monitoring, caching, DDoS protection, or any other suitable query gateway function. In an embodiment, once the query gateway 170 has processed the incoming first query, it forwards this query (or a transformed version of it) to the appropriate instance of the topic scope AI agent 110. For example, this forwarding could be accomplished via internal, high-speed network connections within the provider network 100, ensuring minimal latency and maximum security.

In an embodiment, the topic scope AI agent 110 is implemented as an application programming interface (API) service, facilitating scaling and fault tolerance. Topic vault 130 is a high-performance vector database for efficient similarity search when identifying relevant topic maps. The large language model (LLM) 165 is served using a high-performance serving system for machine learning models, optimized for low-latency inference. A distributed cache could be employed in network 100 to store frequently accessed topic maps 140 and query results, improving response times for common queries.

In an embodiment, the network 100 incorporates a dedicated service, referred to as topic forge 120 in FIG. 1, for topic map 140 generation and updates. The topic forge 120 processes incoming datasets 150 using a distributed computing framework for scalable data processing. Topic forge 120 periodically updates the topic maps 140 based on new data or feedback, ensuring the topic vault 140 remains current. A separate analytics service (not depicted in FIG. 1) is used in network 100 track usage patterns, performance metrics, and query statistics, providing insights for system optimization and billing purposes.

In an embodiment, to handle the multi-tenant aspect, the network 100 implements isolation mechanisms at both the application and infrastructure levels. This includes tenant-specific encryption keys, virtual private clouds, and strict access controls. A central identity and access management system governs permissions across components of the network 100. The network 100 is designed with high availability in mind, potentially utilizing multi-region deployment, automated failover mechanisms, and comprehensive monitoring and alerting systems to ensure reliability and performance for tenants.

3.1 Topic Scope AI Agent

In an embodiment, the topic scope AI agent 110 performs the techniques for topic maps for constrained retrieval augmented generation. The techniques unfold as a set of interconnected operations within the multi-tenant provider network 100. The topic scope AI agent 110, functioning as an API service, initiates its workflow upon receiving a first query through the query gateway 170. The gateway 170, having already handled authentication and rate limiting, routes the query to an appropriate instance of the topic scope AI agent 110 based on tenant identification and current load distribution.

Upon receiving the first query, the topic scope AI agent 110 generates a second query, either by using the first query directly or by refining it based on predefined rules or machine learning algorithms. The agent 110 interfaces with the topic vault 130 using its vector database capabilities to efficiently identify a subset of relevant topic maps from among the stored topic maps 140. This identification process involves semantic similarity computations between the second query and the topics represented in the topic maps.

Each identified topic map in the subset contains a topic pertinent to one or more target datasets 150 and a plurality of references to content items 146 relevant to that topic. The topic scope AI agent 110 aggregates these references, preparing them for transmission along with the second query to the LLM 165 component.

The LLM 165, optimized for low-latency inference, receives the second query and the collated content item references. The LLM 165 generates an answer scoped specifically to the information contained in or pointed to by these references. This constrained generation process produces relevant and accurate responses while minimizing hallucinations or out-of-scope information.

After generating the answer, the LLM 165 returns the results to the topic scope AI agent 110. The agent 110 receives this set of one or more results for the second query. The topic scope AI agent 110 stores these results, potentially utilizing a distributed cache for quick access to frequently requested information. This storage step can serve immediate retrieval purposes but could also feed into analytics services for system optimization and provide data for potential refinement of topic maps by the topic forge 120.

3.2 Topic Forge

In an embodiment, the topic forge 120 is a dedicated service within the multi-tenant provider network 100 that generates and maintains the topic maps 140. Operating on a distributed computing framework, the topic forge 120 processes incoming datasets 150 that may represent one or more target datasets.

In an embodiment, the topic forge 120 employs natural language processing (NLP) and machine learning techniques to analyze the content of the datasets 150. Topic forge 120 can utilize algorithms such as Latent Dirichlet Allocation (LDA), Non-negative Matrix Factorization (NMF), or more advanced transformer-based models to identify prevalent topics within the datasets 150. For each identified topic, the topic forge 120 would generate a topic map structure that includes the topic name, a brief description, and a plurality of references to content items 152 within the datasets 150 that are relevant to that topic.

In an embodiment, the topic forge 120 handles the multi-dataset aspect. The topic forge 120 processes and integrates information from multiple datasets 150, potentially employing techniques like cross-dataset topic modeling or federated learning to create topic maps 140 that span multiple data sources. The topic forge 120 generates comprehensive topic maps that can later be used by the topic scope AI agent 110 to provide multi-source responses to queries.

In an embodiment, for data isolation in the multi-tenant environment, the topic forge 120 implements tenant-specific processing pipelines. Topic forge 120 uses the provider network 100's identity and access management system to ensure that datasets and resulting topic maps are correctly associated with and accessible to the appropriate tenants.

In an embodiment, the topic forge 120 operates both in batch mode for initial topic map generation and in an incremental update mode. In the latter, the topic forge 120 periodically or reactively processes new data additions to the datasets 150, updating existing topic maps or generating new ones as necessary. This ensures that the topic maps 140 stored in the topic vault 130 remain current and reflective of the latest information in the datasets.

In an embodiment, the topic forge 120 implements a feedback loop mechanism represented by circle number six (6) in FIG. 1. The topic forge 120 analyzes usage patterns and performance metrics of the topic scope AI agent 110 to refine and optimize the topic maps over time. The topic forge 120 adjusts the granularity of topics, refining the relevance of content item references, or restructures topic hierarchies based on observed query patterns.

In an embodiment, the topic forge 120 is designed to handle large-scale data processing efficiently. The topic forge 120 employs techniques like parallel processing, data sharding, and distributed computing to manage the potentially massive datasets 150 across multiple tenants. The resulting topic maps are optimized for quick retrieval and efficient similarity searching, aligning with the needs of the topic scope AI agent 110 in rapidly identifying relevant topic maps for incoming queries.

By generating and maintaining high-quality, up-to-date topic maps, the topic forge 120 enables constrained retrieval augmented generation, ensuring that the topic scope AI agent 110 has access to relevant, structured knowledge for generating accurate and contextually appropriate responses to queries.

In an embodiment, the one or more target datasets 150 are diverse, large-scale collections of information that serve as the primary sources for generating topic maps and, ultimately, for answering queries through the topic scope AI agent 110. In the context of a multi-tenant provider network 100, the target dataset(s) 150 are structured to support efficient storage, retrieval, and processing while maintaining strict data isolation between tenants. Each dataset within the collection is implemented as a distributed database or a cloud-based data lake, capable of storing massive amounts of both structured and unstructured data. These datasets utilize large-scale data storage technology for distributed storage and processing or cloud-native solutions for scalable object storage.

The content items 152 within these datasets represent individual pieces of information. These pieces vary widely in nature and format, including but not limited to, the following: text documents (e.g., articles, reports, research papers), structured data (e.g., CSV files, JSON objects, database records), semi-structured data (e.g., XML files, log files), multimedia content (e.g., images, audio files, video files with associated metadata), web pages or web-scraped content, social media posts or user-generated content. time-series data from IoT devices or sensors, code repositories, or technical documentation In an embodiment, content item(s) 152 is associated with metadata, such as creation date, last modified date, author information, and tenant identifier. This metadata is used to maintain data lineage, enabling efficient search and retrieval as well as ensuring proper data governance in the multi-tenant environment.

In an embodiment, the target dataset(s) 150 are organized and indexed in a way that facilitates rapid content analysis and topic extraction by the topic forge 120. This involves implementing indexing structures, like inverted indices for text content, or utilizing specialized databases optimized for specific content types (e.g., graph databases for highly interconnected data).

In an embodiment, access to the target dataset(s) 150 is provided by a unified data access layer. This layer abstracts the complexities of accessing and querying heterogeneous data sources, presenting a consistent interface to other components like the topic forge 120.

In an embodiment, to handle the scale and diversity of the content items 152, data partitioning and sharding strategies are employed. For instance, content items 152 are distributed across multiple nodes based on tenant IDs, content types, or other relevant criteria. This allows for parallel processing and improved query performance.

In an embodiment, the target dataset(s) 150 support versioning and change tracking of content items 152. This maintains the accuracy of derived topic maps and ensures that the topic scope AI agent 110 always works with the most up-to-date information. A change data capture (CDC) mechanism is implemented to track modifications to content items and trigger updates to relevant topic maps.

In an embodiment, security and access control is employed for the target dataset(s) 150. Each content item 152 is associated with specific access permissions, ensuring that tenants can only access their own data. Encryption at rest and in transit is implemented to protect sensitive information.

Several approaches could be used to automatically generate the set of topic maps 140 from the one or more target datasets 150.

Unsupervised topic modeling is one possible approach. A statistical model, such as Latent Dirichlet (LDA), could be applied to the target dataset(s) 150 to discover latent topics. Each discovered topic could form the basis of a topic map, with the most relevant documents or content items for that topic included as references. Additionally, or alternatively, Non-negative Matrix Factorization (NMF) can be used to extract topics from a document-term matrix. The resulting topics and their associated documents could be used to construct topic maps.

Hierarchical clustering is another possible approach. A hierarchical clustering algorithm (e.g., agglomerative clustering) can be applied to group similar documents or content items. Each cluster could represent a topic, with the centroid or most representative items forming the topic description and the cluster members becoming the references.

Keyword extraction and graph-based methods is another possible approach. An unsupervised technique based on a graph-based ranking algorithm or frequency and co-occurrence statistics can be used to extract important keywords and phrases from the dataset. A graph can be constructed where nodes are keywords/phrases and edges represent co-occurrence or semantic similarity. Community detection algorithms can be applied to identify clusters of related terms that could form the basis for topic maps.

Named Entity Recognition (NER) and knowledge graph construction is another possible approach. NER can be applied to the target dataset(s) 150 to identify key entities (e.g., people, organizations, locations). A knowledge graph can be constructed based on entity co-occurrences and relationships. Graph clustering or community detection can be used to identify subgraphs that could serve as topics for the topic maps.

A transformer-based approach is another possible approach. Pre-trained language models like BERT or GPT can be used to generate embeddings for documents or sections of the dataset. Clustering algorithms (e.g., K-means) can be applied to these embeddings to identify topic clusters. The pre-trained language model can also be used to generate summaries to create topic descriptions for each cluster.

A hybrid approach that combines multiple methods above, for example, is another possible approach. For example, topic modeling can be used to identify initial topics. These topics can be refined using NER and knowledge graph techniques, and descriptions can be generated using transformer-based summarization.

Active learning and human-in-the-loop is another possible approach. Initially, an automated approach (e.g., topic modeling) can be used to generate initial topic maps. The initial topics can be presented to human experts for refinement and validation. Feedback can be used to improve the automated generation process iteratively.

Domain-specific ontologies is another possible approach. If available, existing domain-specific ontologies or taxonomies (e.g., a table of contents) can be used to guide the topic map creation. Content items can be mapped to the most relevant concepts in the ontology, using techniques, like semantic similarity or supervised classification, or simply based on a structural association of the content items to a topic within a target dataset (e.g., pages in the same chapter).

Citation network analysis is another possible approach. For academic or research-focused datasets, citation networks can be analyzed to identify key papers or clusters of papers representing important topics or subfields.

Temporal topic modeling is another possible approach. For datasets with a temporal component, techniques like dynamic topic modeling can be used to capture how topics evolve over time, creating time-sensitive topic maps.

Figure 2:
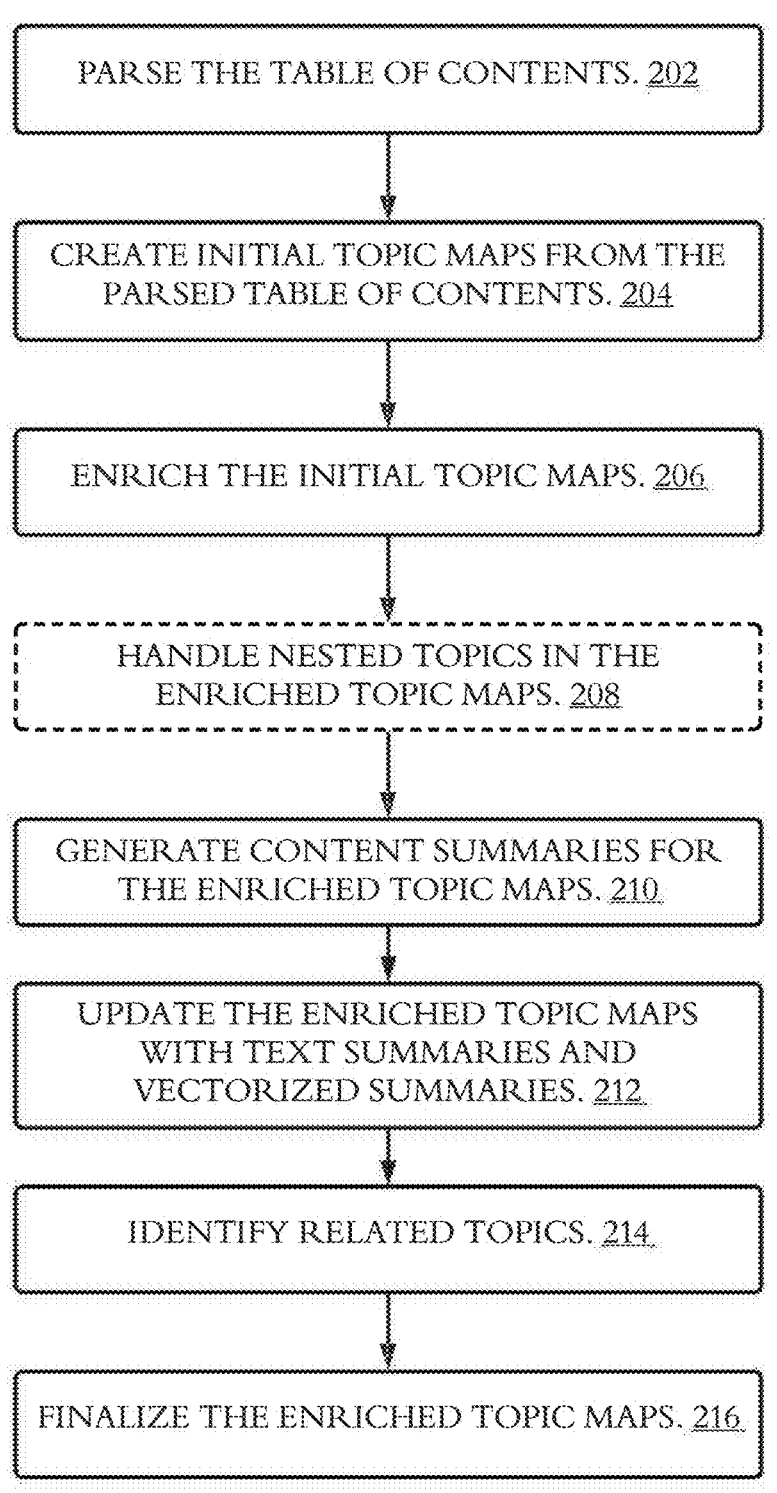
FIG. 2 is a flowchart of a process for topic map generation from online documentation according to an embodiment of the disclosure.

FIG. 2 is a flowchart of a process for topic map generation from online documentation of target dataset(s) 150 according to an embodiment of the disclosure.

The process starts with a corpus of online documentation that has a main table of contents page and multiple web pages (e.g., HTML pages), each corresponding to a section or subsection of the documentation. The table of contents is parsed (operation 202). This can be accomplished using a web scripting library to parse the table or contents page. The hierarchy of topics and their corresponding URLs is extracted based on the parsing.

Initial topic maps are created (operation 204). For each entry in the parsed table of contents, a topic map is created that encompasses a topic name (e.g., the title of the section/subsection), a description that is initially left blank or a placeholder to be filled in or replaced by a later step of the process, and content item references (e.g., URLs) to corresponding web pages (e.g., HTML pages) of the documentation.

The initial topic maps are enriched (operation 206). For each topic map, the corresponding web pages are fetched and parsed, and relevant information for enriching the topic map is extracted from the corresponding web pages. The extracted information includes brief descriptions or meta descriptions (e.g., from certain paragraphs or certain sections of the corresponding web pages). Additionally, or alternatively, a machine learning-based approach, such as a transformer-based approach, is used to extract a summary from the correspond web pages.

Optionally, nested topics are handled (operation 208). If the table of contents has a hierarchical structure, nested topic maps are created, where parent topics include their child topics, and child topics include a reference to their parent topic.

Content summaries are generated (operation 210). For each web page or for a collection of corresponding web pages, a brief summary of its content is generated. For example, a transformer-based approach may be used to generate the brief summary.

The topic maps are updated with the generated summaries (operation 212). This includes adding the generated summaries to the corresponding topic maps.

One or more embodiments extend operation 212 to incorporate vector representations of generated summaries into the topic maps. After generating content summaries in operation 210, each summary undergoes a vectorization process. This process employs natural language processing techniques, such as transformer-based models or sentence encoders, to transform the textual summaries into dense, high-dimensional vector embeddings.

The vectorization step captures the semantic essence of each summary in a fixed-length numerical representation. These embeddings encapsulate semantic relationships in a format conducive to efficient computational processing. Once generated, the vector embeddings are integrated into the corresponding topic maps alongside the textual summaries.

The update process in operation 212 now involves a two-fold augmentation of the topic maps. First, the textual summaries are added to their respective topic map structures. Concurrently, one or more embodiments append the newly generated vector embeddings to the same topic map entries. This dual update ensures that each topic map contains both human-readable summaries and machine-optimized vector representations.

By incorporating these vector embeddings, the system enhances its capability for semantic similarity comparisons and efficient information retrieval. The embeddings facilitate rapid similarity searches, enabling more nuanced and contextually relevant topic identification in subsequent query processing steps. This augmented approach synergizes the benefits of human-interpretable summaries with computationally efficient vector representations, thereby enhancing the overall functionality and performance of the topic map system.

Related topics are identified (operation 214). For example, a similarity, such as cosine similarly on TF-IDF vectors, can be used to find related topics. This includes creating TF-IDF vectors for topic descriptions, calculating cosine similarity between topics, and adding the top-N related topics to each topic map.

The topic maps are finalized (operation 216). This includes combining the information gathered into a final set of topic maps. This may also include ensuring that the required fields are present and formatting the topic map according to the required structure.

One or more embodiments enhance the topic map generation process of FIG. 2 by incorporating vector representations of extracted summaries as additional metadata. During the enrichment phase (operation 206), after extracting summaries from corresponding web pages, these summaries are transformed into dense vector embeddings using techniques such as transformer-based models or sentence encoders. These embeddings capture semantic information in a high-dimensional space, enabling nuanced comparisons between topics.

The vector embeddings are then stored alongside other metadata within each topic map structure. This augmentation facilitates topic map identification and retrieval mechanisms. For instance, when processing a query, one or more embodiments leverage these embeddings to perform semantic similarity searches, identifying relevant topic maps based on the conceptual closeness of their associated content rather than relying solely on keyword matching.

Furthermore, the vector representations enable clustering of related topics in the embedding space. This clustering can be utilized to automatically generate topic hierarchies or to refine existing ones. One or more embodiments employ dimensionality reduction techniques to visualize these relationships, providing insights into the thematic structure of the documentation.

During the related topics identification step (operation 214), one or more embodiments calculate cosine similarity between the embedding vectors. This approach yields semantically meaningful relationships between topics. One or more embodiments then incorporate these similarity scores into the final topic map structure, enabling navigation and exploration of interconnected concepts within the documentation.

3.3 Topic Vault

Referring back to FIG. 1, a topic map 140 may contain a topic name or identifier 142, a description 144 of the topic, and one or more content item references 146 (e.g., as URLs or URIs). A topic map 140 may additionally contain one or more related topics and hierarchical information reflecting parent or child relationships between topics.

The topic vault 130 functions as the storage and retrieval system for topic maps 140 and content item references 146. The topic vault 130 enables efficient identification and access to relevant topic maps for query processing.

In an embodiment, the topic vault 130 is implemented as a high-performance, distributed database system. The topic vault 130 is designed to handle large-scale storage and rapid retrieval of structured data. The topic vault 130 utilizes a combination of technologies to optimize for different access patterns. The underlying storage is built on a distributed SQL or NoSQL database.

In an embodiment, to support the efficient similarity search for identifying relevant topic maps, the topic vault 130 incorporates a vector database component. This could be implemented using specialized vector search engines optimized for high-dimensional nearest neighbor search, useful for quickly finding topic maps that are semantically similar to incoming queries.

In an embodiment, the topic maps 140 stored in the topic vault 130 are structured as complex objects, each including any of the following: a unique identifier, the topic name, the topic identifier, the topic description, the topic summary, a vector representation (e.g., an embedding) of the topic (for similarity matching), metadata such, as creation date, last updated date, and associated tenant ID, or a list or array of references to content items 146 relevant to the topic.

In an embodiment, the content item references 146 are stored as lightweight pointers or identifiers, rather than the full content, to optimize storage and retrieval efficiency. These references include any of the following: unique identifiers for the content items in the target dataset(s) 150 (e.g., in the form of URIs or URLs), brief metadata about the content items (e.g., title, type, creation date), or relevance scores indicating how strongly each item relates to the topic.

In an embodiment, when the topic scope AI agent 110 needs to identify relevant topic maps for a given query, it sends a request to the topic vault 130 as represented by circle numbered three (3) in FIG. 1. This request includes any of the following: the query vector (a semantic representation of the query as an embedding), the tenant ID (for data isolation), or any additional filtering criteria. The topic vault 130 then performs a high-speed similarity search using its vector database component. The topic vault 130 returns a ranked list of the most relevant topic maps along with their associated content item references.

In an embodiment, to handle the multi-tenant nature of the system, the topic vault 130 implements data sharding and partitioning strategies. Topic maps and content references are partitioned by tenant ID, ensuring data isolation and allowing for efficient scaling as the number of tenants grows. Each partition might be further sharded based on topic characteristics or access patterns to distribute the load across multiple nodes.

In an embodiment, the topic vault 130 implements a robust caching layer using a distributed caching system. This cache stores frequently accessed topic maps and query results, significantly reducing latency for common queries and decreasing the load on the primary storage system.

In an embodiment, to maintain consistency and durability, the topic vault 130 employs a multi-node replication strategy. This ensures that topic maps and content references are available even in the face of individual node failures. Techniques, such as read-repair or anti-entropy processes, can be used to maintain consistency across replicas.

In an embodiment, the topic vault 130 provides APIs for both read and write operations. The topic forge 120 uses write APIs to update or create new topic maps based on its analysis of the target dataset(s) 150. The topic scope AI agent 110 uses read APIs to retrieve relevant topic maps and content references for query processing.

In an embodiment, the topic vault 130 implements versioning for topic maps, allowing the system to track changes over time. This is useful for maintaining the accuracy of responses and enabling features like historical analysis or rollback capabilities.

In one or more embodiments, the description 144 component of a topic map 140 can be extended to incorporate both textual summaries and corresponding vector representations. These summaries are concise encapsulations of the topic's key concepts, generated through advanced natural language processing techniques such as extractive or abstractive summarization. The summaries provide a dense, human-readable representation of the topic's content.

Accompanying each summary, a high-dimensional vector embedding can be computed and stored. These embeddings may be generated using transformer-based models or sentence encoders, which capture the semantic essence of the summary in a fixed-length numerical representation. The vector embeddings enable efficient similarity comparisons and facilitate topic map retrieval.

By storing both the textual summaries and their vector representations within the description 144, one or more embodiments provide flexibility in information retrieval and presentation. The textual summaries can be directly presented to users or utilized in generating human-readable responses. Meanwhile, the vector embeddings support rapid similarity searches, enabling one or more embodiments to quickly identify relevant topics based on semantic closeness rather than mere keyword matching.

In one or more embodiments, the description 144 component of a topic map 140 can be expanded to encompass a more comprehensive representation of the topic. This enhanced structure includes a title, a text summary, and vectorized representations of both the title and the text summary. The title serves as a concise identifier for the topic, capturing its essence in a few words. The text summary provides a more detailed explanation of the topic's key points, offering a human-readable overview of the content.

Complementing these textual elements, the description 144 also incorporates vectorized representations. These vectors are generated using natural language processing techniques, such as transformer-based models or sentence encoders. The title and text summary are individually processed to create dense, high-dimensional embeddings that capture their semantic content. These vectorized representations enable efficient similarity comparisons and facilitate advanced retrieval mechanisms within the topic vault 130.

By including both textual and vectorized elements in the description 144, one or more embodiments provide flexibility in information processing and retrieval. The textual components (title and summary) remain easily interpretable by humans, while the vector embeddings support rapid, semantically-aware computations.

3.4 Topic Maps

In an embodiment, each topic map 140 contains a topic name or ID 142 of the target dataset(s) 150 and a set of references 146 to content items 152 of the target dataset(s) 150. The topic map 140 represents a specific subject or theme within the larger target dataset(s) 150. The topic map 140 serves as the central concept around which the related content items are organized. Some non-limiting examples of topics that could by represented by topic maps include "Introduction to Python," "Climate Change Effects," or "20th Century American Literature."

The set of references 146 acts as pointers or links to specific content items 152 within the target dataset(s) 150. The content items 152 are discrete pieces of information within the target dataset(s) 150. For example, a content item 152 can be a document, an article, a web page, a database entry, or any other form of structured or unstructured data. A content item 152 is deemed relevant to the topic of its associated topic map 140. A content item 152 can be associated with multiple topic maps 140 if relevant to multiple topics. The content items 152 referenced by a topic map 140 are specifically chosen for their relevance to that topic. This relevance ensures that the information provided to the generative AI agent 160 is focused and pertinent to the query at hand. The target dataset(s) 150 represent a knowledge base and the broader collection of information from which the topic maps 140 are derived.

Topic maps 140 provide an organized knowledge structure. Topic maps 140 create a structured representation of knowledge within the target datasets(s) 150. This organization facilitates more efficient and accurate information retrieval. Topic maps 140 provide contextual relevance. By grouping related content items 152 under specific topics, the topic scope AI agent 110 can provide contextually relevant information to the generative AI agent 160. The structure of the topic maps 140 allows for easy addition of new topics as the target dataset(s) 150 grow or evolve over time. The topic maps 140 provide for focused information retrieval. When responding to a query, the AI agent 160 can focus on the most relevant subset of information, rather than processing the entirety of the target dataset(s) 150. The topic maps 140 provide noise reduction. By pre-selecting relevant content items 152 for each topic, the likelihood of irrelevant or noisy information being considered by the AI agent 150 is reduced. The topic maps 140 provide flexibility. The structure of the topic maps 140 allows for various types of content items to be referenced accommodating diverse target dataset(s) 150 and information types. The topic maps 140 provide hierarchical potential. The structure of the topic maps 140 support hierarchical relationships between topics, allowing for more complex knowledge representation. The topic maps provide improved accuracy. By constraining the AI agent 160's knowledge to carefully curated, topic-specific content, the topic scope AI agent 110 can potentially reduce hallucinations and improve the accuracy of generated responses. The topic maps 140 enable the topic scope AI agent 110 to create a focused, relevant subset of information for a query, allowing the generative AI agent 160 to produce more accurate and contextually appropriate responses while efficiently managing large and diverse target dataset(s) 150.

In one or more embodiments, the topic map 140 structure offers an advantage over traditional retrieval-augmented generation (RAG) scenarios by eliminating the need for chunk-level vectorization of content items 152. In existing RAG approaches, each chunk of content typically requires vectorization, leading to computational overhead and storage requirements that scale linearly with the volume of content. The topic map 140 structure, however, shifts the vectorization focus to the description or summary level.

By vectorizing the descriptions or summaries associated with topic maps 140, one or more embodiments provide a more efficient representation of the knowledge space. This approach reduces the overall computational burden of maintaining vector representations for large datasets. The summary-level vectorization captures the essence of topics without the granularity of chunk-level embeddings, providing a balance between semantic richness and computational efficiency.

Furthermore, this strategy allows for more flexible updates to the underlying content items 152 without necessitating re-vectorization of entire documents. When content changes, only the affected summary might need updating, potentially reducing the frequency and scope of vector recalculations. This approach also facilitates faster query processing, as similarity searches can be performed on a smaller set of topic-level vectors rather than a vast array of chunk-level embeddings.

The topic map 140 structure thus presents a more scalable and maintainable solution for large-scale information retrieval systems. By avoiding chunk-level vectorization, the system can handle larger volumes of content with reduced computational resources, while still maintaining the ability to perform semantic searches and provide contextually relevant information to the generative AI agent.

One or more embodiments of the topic map approach provide advantages over traditional retrieval-augmented generation (RAG) scenarios. In existing RAG implementations, entire datasets are typically chunked and vectorized, leading to potential fragmentation of related information across multiple vectors. This fragmentation can result in suboptimal similarity search retrieval, as semantically connected content may be dispersed across different chunks or datasets.

Topic maps 140 address this issue by grouping relevant or similar information together without the need for comprehensive chunking of all datasets. Instead of vectorizing individual chunks, one or more embodiments focus on creating and vectorizing summaries of relevant content. This approach consolidates related information under specific topics, affirming that semantically connected content remains cohesive within the topic map structure.

By vectorizing only the summaries or descriptions associated with topic maps, one or more embodiments achieve an efficient and contextually aware representation of the knowledge space. One or more embodiments reduce the computational overhead associated with large-scale vectorization while maintaining the ability to perform effective similarity searches.

Furthermore, one or more embodiments enhance the contextual relevance of information retrieval. When the generative AI agent 160 processes a query, it can access a pre-organized, topically coherent set of information rather than disparate chunks from across multiple datasets. This organization potentially leads to more accurate and contextually appropriate responses, as the AI agent works with a curated subset of information that maintains the semantic relationships within each topic.

3.5 Generative AI Agent

The generative AI agent 160, incorporating the large language model (LLM) 165, generates contextually relevant and accurate responses to queries. This component leverages NLP and machine learning techniques to understand queries and generate human-like text responses.

In an embodiment, the generative AI agent 160 receives a query along with the plurality of references to content items from the identified subset of topic maps. The agent 160 acts as an orchestrator, preparing the input for the LLM 165 and managing the generation process. In an embodiment, the LLM 165 is based on a state-of-the-art transformer architecture, such as GPT (Generative Pre-trained Transformer) or a similar model. The LLM 165 is pre-trained on a vast corpus of text data, enabling it to understand and generate human-like text across a wide range of topics and styles. In an embodiment, the LLM 165 is fine-tuned for the specific task of generating responses within the constraints provided by the topic maps and content references.

Figure 3:
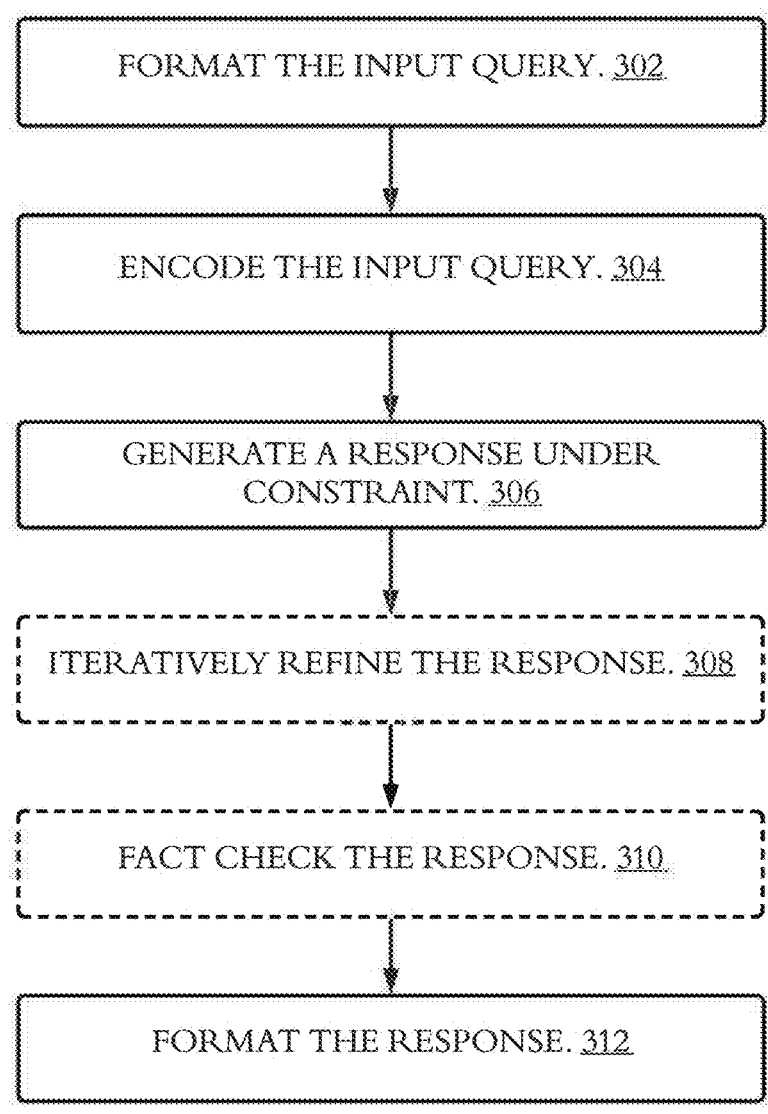
FIG. 3 is a flowchart of a process performed by a generative artificial intelligence (AI) agent and a large language model (LLM) in processing a query received from a topic scope AI agent according to an embodiment of the present disclosure.

FIG. 3 is a flowchart of a process performed by the generative AI agent 160 and LLM 165 in processing a query received from the topic scope AI agent 110 according to an embodiment of the present disclosure.

The process involves input preparation (Operation 302). The generative AI agent 160 formats the query, and the content item references into a structured prompt for the LLM 165. This prompt includes special tokens or formatting to delineate the query, the relevant topics, and the constraints imposed by the content references.

The process also involves context encoding (Operation 304). The LLM 165 encodes the provided context (query and content references) into its internal representation using a combination of token embeddings and positional encodings.

The process further involves constrained generation (Operation 306). The LLM 165 generates a response using its trained parameters but with the constraint of using information provided in the content references. This constraint is enforced through careful prompt engineering and potentially through modified decoding algorithms that restrict the model 165's output to information present in the given context.

The process optionally involves iterative refinement (Operation 308). The generative AI agent 160 may employ a multi-step generation process, where initial outputs are analyzed and refined to ensure adherence to the provided constraints and to improve relevance and coherence.

The process optionally involves fact checking (Operation 310). The generated response might be cross-referenced against the provided content references to ensure factual accuracy and adherence to the constrained information set.

The process involves response formatting (Operation 312). The final generated text is formatted by the generative AI agent 160 into a structured response suitable for return to the topic scope AI agent 110.

While constrained generation (operation 306) involves only using information provided in the content references in an embodiment, the constraint on the generative AI agent 160 and LLM 165 is software in another embodiment. This allows for a more flexible use of information while still maintaining a strong emphasis on the provided content references. In this scenario, the aim is to use the information from the content references as the primary source, but some degree of additional information or context needs to be incorporated.

In this softer constraint embodiment, the generative AI agent 160 is configured to prioritize information from the provided content references while allowing for some supplementary information from the LLM 165's pre-trained knowledge. The goal is to enhance the response with additional context or related information when appropriate without straying too far from the core information provided in the content references. For example, 70-80% of the information in the generated response may come directly from the provided content references. For example, this means that for every 100 tokens or semantic units in the response, 70-80 would be traceable to the content references. Another example, 50-70% of the information in the generated response could come from the content references. This allows for a more balanced mix of referenced information and supplementary knowledge from the LLM 165.

In an embodiment, the generative AI agent 160 utilizes information weighting. The generative AI agent 160 assigns higher weights to information from the content references during the generation process. This is achieved through prompt engineering or by modifying the attention mechanisms in the LLM 165 to give preference to tokens associated with the reference content.

In an embodiment, the generative AI agent 160 utilizes confidence thresholds. The generative AI agent sets confidence thresholds for incorporating non-referenced information. For example, if the LLM 165 generates a statement not found in the references, it would only be included if the model 165's confidence in that statement exceeds a high threshold (e.g., 90% confidence).

In an embodiment, the generative AI agent 160 incorporates a fact-checking module. The fact-checking module verifies generated content against the references. This module allows non-referenced information to pass if it does not contradict the references and enhances the response's quality.

In an embodiment, the generative AI agent 160 utilizes semantic similarity scoring. The generative AI agent 160 employs semantic similarity measures to ensure that even when incorporating additional information, the overall meaning and intent closely align with the content references.

In an embodiment, the generative AI agent 160 employs dynamic constraint adjustment. The generative AI agent 160 dynamically adjusts the strictness of the constraint based on various factors, such as query complexity, available reference information, and user preferences. For instance, it might allow more flexibility for broad, open-ended queries while maintaining tighter constraints for specific, fact-based questions.

In an embodiment, the generative AI agent 160 employs labeling or marking. The generated response includes subtle markers or metadata indicating the parts of the response that are directly from references and those that are supplementary. This transparency could be valuable for users who need to distinguish between referenced and inferred information.

In an embodiment, the generative AI agent 160 continuously monitors the proportion of referenced vs. non-referenced information in the generated responses. This is done by token-level tracking, semantic unit analysis, periodic auditing, or combination thereof. Token-level tracking involves keeping a count of tokens that can be directly attributed to the references versus those that are generated based on the LLM 165's general knowledge. Semantic unit analysis breaks down the response into semantic units (e.g., facts, statements, or concepts) and calculates the percentage that can be traced back to the references. Periodic auditing involves regularly sampling generated responses for manual or automated review to ensure adherence to the desired ratios of referenced information.

The softer constraint approach allows the generative AI agent 160 and LLM 165 to produce more nuanced and comprehensive responses. For example, when answering a query about a specific historical event, the system could primarily use information from the provided references while also incorporating relevant contextual information or related facts that enhance the user's understanding even if those additional details were not explicitly in the references.

This softer constraint approach strikes a balance between the accuracy and reliability offered by strict adherence to referenced information and the depth and richness that can come from leveraging the broader knowledge base of the LLM 165. It allows for more flexible and potentially more helpful responses while maintaining a strong grounding in the verified information provided by the topic maps and content references.

In an embodiment, the generative AI agent 160 implements one or more techniques to enhance the quality and reliability of the generated responses, including any of the following: temperature control, nucleus sampling, repetition penalties, length optimization, or a combination thereof. Temperature control involves adjusting the randomness in the LLM 165's output to balance between creativity and determinism. Top-k and top-p (nucleus) sampling involves limiting the token selection during generation to maintain coherence and relevance. Repetition penalties discourage the model from repeating information or getting stuck in loops. Length optimization ensures the generated response is appropriately sized for the query and available information.

In an embodiment, to handle the multi-tenant nature of the system, the generative AI agent 160 maintains isolated execution environments for each tenant, ensuring that no cross-tenant information leakage occurs during the generation process.

In an embodiment, the generative AI agent 160 employs a batching mechanism to efficiently process multiple queries in parallel, maximizing the utilization of the LLM 165's computational resources. This is particularly useful in a multi-tenant environment, where numerous queries might be processed simultaneously.

As instructed by the prompt sent from the topic scope AI agent 110, the generative AI agent 160 ensures that the LLM 165 only, mostly, or significantly uses information from the provided content references, mitigating the risk of hallucination or incorporation of out-of-scope information. This constrained generation distinguishes from more general-purpose language models, ensuring higher accuracy and reliability in the generated responses. By constraining the LLM 165's output to relevant, verified information from the topic maps, the generative AI agent 160 and LLM 165 enable the topic scope AI agent 110 to generate highly relevant, accurate, and contextually appropriate responses to queries.

4.0 Example Methods for Topic Maps for
Constrained Retrieval Augmented Generation FIG. 4A is a flowchart of a method for topic maps for constrained retrieval augmented generation according to some embodiments of the present disclosure.

As a pre-processing step to the method of FIG. 4A represented by the circle numbered one (1) in FIG. 1, a set of topic maps 140 is generated based on one or more target datasets 150. This process is executed by the topic forge 120 component and involves data analysis and NLP techniques to distill structured, topic-oriented knowledge from the raw datasets 150.

In an embodiment, the pre-processing process begins with the ingestion of the one or more target datasets 150 into the topic forge 120. This involves reading data from various sources that could include distributed file systems, cloud object storage, or database systems. The ingestion process may utilize data streaming technologies, platforms, or cloud services for streaming data ingestion, ensuring scalability and fault tolerance.

In an embodiment, the raw data undergoes cleaning and normalization processes. This includes handling missing values, removing duplicates, standardizing formats, and resolving inconsistencies. Distributed data processing frameworks are employed for distributed data processing, allowing for efficient handling of large-scale datasets.

In an embodiment, for unstructured or semi-structured data, text extraction techniques are applied. This involves parsing PDFs, extracting text from HTML, or processing image data using Optical Character Recognition (OCR). The extracted text then undergoes preprocessing, including tokenization, lowercasing, stop word removal, and stemming or lemmatization.

In an embodiment, named entity recognition is applied to the one or more target dataset(s) 150 to identify key concepts and entities within the one or more target dataset(s) 150. This process identifies and classifies named entities in the text into predefined categories, such as personal names, organizations, locations, etc. Deep learning models trained on relevant corpora are used for this task.

In an embodiment, topic modeling is performed. Techniques, such as Latent Dirichlet Allocation (LDA), Non-Negative Matrix Factorization (NMF), or more advanced neural topic models are employed to discover latent topics within corpus 150. These algorithms analyze patterns of word co-occurrences to identify coherent themes.

In an embodiment, topic forge 120 conducts hierarchical topic structuring to create a more organized knowledge structure. This involves hierarchical LDA or custom algorithms that cluster topics into a tree-like structure, allowing for different levels of granularity in the topic maps.

In an embodiment, topic forge 120 performs cross-dataset topic alignment. In the case of multiple datasets 150, an additional step of aligning and merging topics across datasets is performed. This involves techniques, like transfer learning or domain adaptation, that create coherent topics that span multiple data sources.

In an embodiment, content item association is performed by topic forge 120. For each identified topic, relevant content items 152 from the dataset(s) 150 are associated. This process uses techniques like TF-IDF (Term Frequency-Inverse Document Frequency) scoring or more advanced semantic similarity measures based on word embeddings or sentence transformers.

In an embodiment, topic forge 120 performs topic description generation where, for each topic, a concise description is generated. This involves extractive summarization techniques to select representative sentences from associated content items or abstractive summarization using sequence-to-sequence neural network models to generate descriptions.

In an embodiment, topic forge 120 performs metadata enrichment where topics and their associated content items are enriched with metadata such as relevance scores, confidence levels, and source dataset identifiers. This metadata is used for downstream processes in query handling and response generation.

In an embodiment, topic forge 120 constructs vector representations to facilitate efficient similarity search during query processing where each topic is encoded into a dense vector representation. This uses embeddings or custom neural network encoders trained on the specific domain of the datasets 150.

In an embodiment, automated and potentially manual processes are implemented to assess the quality and coherence of generated topics. This involves statistical measures of topic coherence, diversity checks, and expert review for critical domains.

In an embodiment, a versioning system is implemented to track changes in the topic maps over time. This includes maintaining a changelog that records significant updates, additions, or deletions of topics.

The generated topic maps 140, including the associated metadata and vector representations, are stored in the topic vault 130. This involves a combination of traditional database systems for structured data and vector databases for efficient similarity search capabilities.

The topic maps 140 are indexed to optimize for fast retrieval during query processing. This involves building inverted indices, setting up efficient data structures for vector search, and potentially pre-computing common query results for caching.

This pre-processing step transforms raw, unstructured data from the target datasets 140 into a rich, structured set of topic maps 140. These topic maps 140 serve as the foundation for the method of FIG. 1, enabling efficient and accurate responses to user queries by providing a well-organized knowledge base for the topic scope AI agent 110 to work with.

Turning now to a discussion of the method of FIG. 4A, the method starts with the query gateway 170 receiving a first query and/or an identification of a target dataset(s) for use in query execution (operation 402A). The first query and/or an identification of the target dataset(s) may be received via user input. In one example, a system receives the first query with an identification of the target dataset(s) with explicit or implicit instructions for limiting the scope of query results to the target dataset(s). In another example, the system receives the first query and determines the target dataset(s) as a function of one or more attributes of the first query. The system determines the target dataset based on a source of the query, a time when the query is received, an entity associated with the query, etc. In another example, the system determines the target dataset(s) based on a stored configuration.

Alternatively, or additionally, the system may receive a request for a set of topic maps for the target dataset(s). A set of topic maps may be referred to herein as an "information map." In response to the request for the set of topic maps (e.g., the information map), the system determines the set of topic maps as further described below with reference to operation 408A. The system then presents the set of topic maps on an interface or transmits the set of topic maps to a user device.

In an embodiment, a system component, within the *intermedia* network 180, receives the first query and/or an identification of the target dataset. The intermediate network 180 could be implemented, for example, as a content delivery network (CDN) or edge network. In an embodiment, the query gateway 170 performs various operations with respect to receiving the first query including any of the following: load balancing, protocol handling, authentication, authorization, tenant identification, rate limiting checks, query normalization, metadata enrichment, logging and monitoring, DDoS protection, caching checks, query queuing, making an initial routing decision, telemetry initiation (request tracing), or any other suitable operations.

Once these steps are completed, the query gateway 170 prepares to forward the now-validated, authenticated, and enriched query to the appropriate instance of the topic scope AI agent 110 for further processing as represented by the circle numbered two (6) in FIG. 1.

In an embodiment, the system generates a second query based on the first query (operation 404A), for transmission to a search engine (e.g., a generative AI agent comprising an LLM). The second query, as referred to herein, may be the same as the first query, a modification of the first query, or otherwise generated based at least in part on the first query. Accordingly, generating the second query may simply include generating a message for transmission to the search engine that incorporates the first query, or a modification thereof. The second query may be generated, based on the first query, by the topic scope AI agent 110, the query gateway 170, or another suitable component of network 100.

Generating the second query based on the first query can involve various techniques to enhance, clarify, or refocus the original query to improve the relevance and accuracy of the results. The choice of method(s) for generating the second query depends on various factors, such as the nature of the target dataset, the structure of the topic maps, the complexity of the original query, and the specific goals of the system. A combination of the following techniques can be employed to create the most effective second query.

In an embodiment, query expansion is performed where synonyms or related terms are added to the first query to broaden the scope of the query. For example, if the first query is "car maintenance," then second query could be "car maintenance OR automobile repair OR vehicle upkeep."

In an embodiment, query refinement is performed where specific terms are added to the first query to narrow down the focus of the query. For example, if the first query is "python programming", then the second query could be "python programming for data science."

In an embodiment, query disambiguation is performed if the first query is ambiguous. In this case, multiple specific queries are generated as the second query. For example, if the first query is "jaguar", then the multiple specific queries could be "jaguar animal", "jaguar car", and "jaguar operating system".

In an embodiment, context-based augmentation is performed where the user's history or profile is used to add contextual information. For example, if the first query is "best restaurants", then the second query could be "best Italian restaurants in [user's location]".

In an embodiment, intent classification and query rewriting is performed. The intent of the first query is classified, and the first query is rewritten to better match that intent. For example, if the first query is "how to lose weight", then the second query could be "effective weight loss methods and diet plans".

In an embodiment, entity recognition and linking is performed. Named entities in the first query are identified and linked to a knowledge base for more precise querying. For example, if the first query is "Obama presidency", then the second query could be "Barack Obama United States presidency 2009-2017".

In an embodiment, query segmentation is performed when the first query is complex and thus broken down into simpler sub-queries as the second query. For example, if the first query is "compare iPhone and Samsung Galaxy features and prices", then the simpler sub-queries could be "iPhone features", "Samsung Galaxy features", "iPhone pricing", and "Samsung Galaxy pricing".

In an embodiment, spelling correction and query normalization is performed where spelling errors are corrected and terms normalized (e.g., singularization/pluralization). For example, if the first query is "best laptops 2023", then the second query could be "best laptops 2023".

In an embodiment, query translation is performed. If the system supports multiple languages, the first query is translated to the language of the target dataset(s) 150. For example, if the first query is in Spanish, such as "mejor coche eléctrico", then the second query could be in English as "best electric car".

In an embodiment, time-based query augmentation is performed. Time-related terms are added to the first query to make the query more current or specific. For example, if the first query is "Olympic games", then the second query could be "Olympic games 2024 Paris".

In an embodiment, a question to declarative statement conversion operation is performed where converting question-format queries into declarative statements better matches with topic maps. For example, if the first query is "What are the symptoms of COVID-19?", then the second query could be "COVID-19 symptoms and diagnosis".

In an embodiment, aspect-based query generation is performed. In particular, multiple queries are generated as the second query based on different aspects of the first query. For example, if the first query is "climate change", then the multiple queries could include "climate change causes", "climate change effects", and "climate change solutions".

In an embodiment, query abstraction is performed when very specific queries are generalized to match broader topics in the topic maps. For example, if the first query is "how to change oil in a 2015 Toyota Camry", then the second query could be "car maintenance oil change procedures".

In an embodiment, keyword extraction and reformulation are performed. Key terms are extracted from the first query, and the first query is reformulated into a more structured query. For example, if the first query is "I need to know about the American Civil War", then second query could be "American Civil War history causes and effects".

In an embodiment, query expansion using word embeddings is performed to find semantically similar terms and expand the first query. For example, if the first query is "artificial intelligence", then the second query could be "artificial intelligence machine learning neural networks".

In an embodiment, the topic scope AI agent identifies a set of topic maps, corresponding to the target dataset(s), for use in execution of the second query (operation 406A). A topic map identifies a particular topic associated with one or more content items in the target dataset(s). The topic map, for the particular topic, further identifies references to the one or more content items that are associated with the particular topic. Additionally, the topic map may further include a description or summary of the one or more content items that are associated with the particular topic.

Identifying the set of topic maps may include accessing the set of topic maps from a repository of pre-computed topic maps for various datasets including the target dataset(s). The topic maps may be pre-computed to avoid runtime delays for query execution. Alternatively, or additionally, identifying the set of topic maps may include computing the set of topic maps, in real-time, subsequent to receiving an identification of the target dataset(s).

Various techniques can be used to identify the set of topic maps, corresponding to the target dataset(s), for execution of the second query. The choice of method(s) depends on numerous factors, such as the size and structure of the topic map set, the nature of the queries, computational resources available, and the specific requirements of the system in terms of accuracy and speed. In fact, a combination of techniques can be used.

For large groups of topic maps, the topic vault 130 can use indexing techniques (e.g., inverted index) or approximate nearest neighbor search to speed up the matching process. The topic vault 130 can be designed to handle growth in both the number of topic maps and query volume. The topic vault 130 can allow for easy addition or modification of topic maps without requiring a complete system overhaul. The topic vault 130 or the topic scope AI agent 110 can incorporate a feedback mechanism (e.g., based on reinforcement learning) to learn from user interactions and improve the relevance matching over time.

Various techniques may be employed by the topic scope AI agent 110 or by the topic scope AI agent 110 and the topic vault 130 to identify a set of the topic maps 140 that are to be used for query execution. Any or a combination of the techniques may be used in an embodiment.

One possible technique is keyword matching where keywords are extracted from the query using techniques such as TF-IDF. These keywords are compared against the topic names and descriptions in each topic map. And topic maps that have a high overlap of keywords are selected.

Another technique uses a vector space model. The query and the topic map descriptions are converted into vector representations (e.g., using TF-IDF or word embeddings). The cosine similarity is computed between the query vector and each topic map vector, and topic maps with similarity scores above a certain threshold are selected for inclusion in the subset of relevant topic maps.

Another technique employs semantic similarity using word embeddings. Here, pre-trained word embeddings (e.g., Word2Vec, GloVe, or FastText) are used to represent words in the query and topic maps. The semantic similarity between the query and each topic map using a similarity measure, such as cosine distance, is calculated. Topic maps with the highest semantic similarity scores are selected for inclusion in the subset of relevant topic maps.

Another technique uses topic modeling. Topic modeling techniques (e.g., Latent Dirichlet Allocation) are applied to the entire set of topic maps 140. The topic distribution for the given query is inferred. Topic maps that have a high probability for the same topics as the query are selected for inclusion in the subset of relevant topic maps.

Hierarchical matching is another possible technique. If the topic maps are organized hierarchically, matching topic maps to the query may proceed from the top-level topics and drill down. This can be particularly efficient for large sets of topic maps.

Machine learning (ML) classification is another possible technique. A multi-label classifier (e.g., using neural networks or random forests) is trained on the topic maps. The trained classifier predicts the most relevant topic maps for the given query.

Graph-based relevance is another possible technique. Topic maps are represented as nodes in a graph with edges representing relationships between topics. A graph algorithm is used to rank the relevance of topic maps based on the query.

Fuzzy string matching is another possible technique. Fuzzy string matching algorithms (e.g., Levenshtein distance) can be used to handle slight variations or misspellings in the query to match the query against topic names and descriptions.

Named entity recognition (NER) is another possible technique. NER is applied to both the query and topic maps to identify key entities. Topic maps that contain the same entities as the query are then matched.

An ensemble approach is another possible technique. Here, multiple methods above are combined, and a voting or weighted scoring system is used to select the most relevant topic maps.

Query expansion and matching is another possible technique. The query is expanded using techniques like synonyms, hypernyms, or related terms from a knowledge base. This expanded query is matched against the topic maps.

Contextual embeddings are another possible technique. Contextual embedding models, like BERT or GPT, are used to generate representations for both the query and topic maps. Similarities between the query and the topic maps are calculated in this contextual embedding space.

Relevance feedback is another possible technique. Initially, a subset of topic maps is selected using one of the above methods. Relevance feedback techniques (e.g., Rocchio algorithm) are then used to refine the selection based on user interaction or performance metrics.

Continuing the discussion of the process of FIG. 4A, the topic scope AI agent 110 communicates with the generative AI agent 160 to produce a response (operation 408A; see also the circle numbered four (4) in FIG. 1). The topic scope AI agent sends at least two pieces of information to the generative AI agent 110: (1) the second query and (2) the content item references to content items from each relevant topic map.

The second query is either the same as the first query or a modified version of it. The second query represents the specific question or task that the AI agent 160 needs to address.

The content item references are the links or pointers to specific content items within the target dataset(s) 150. These references come from each topic map in the subset identified as relevant to the second query. This collection of content item references defines the scope of information that the AI agent 160 should consider.

The generative artificial intelligence (AI) agent 160 is responsible for producing the answer or response to the second query. The AI agent 160 includes an LLM 165 that is trained on vast amounts of text data and can understand and generate human-like text. The LLM 165 may be based on GPT, BERT, or other like transformer architectures, for example.

The topic scope AI agent 110 tasks the AI agent 160 to produce a response to the second query that the AI agent 160 generates dynamically and not simply by retrieving information from a database. The generated answer is constrained to (scoped to) the information contained in the referenced content items. This scoping aims to improve the accuracy and relevance of the generated answer.

The topic scope AI agent 110 guides the generative AI agent 160 to produce answers that are constrained to the referenced content items. This process involves crafting prompts that instruct the generative AI agent 160 on how to use the provided information.

In an embodiment, the topic scope AI agent 110 receives a set of one or more query results from the generative AI agent 160 (operation 410A; see also the circle numbered five (5) in FIG. 1) and stores the one or more query results (operation 410A). These steps are executed by the topic scope AI agent 110 in conjunction with other system components.

In an embodiment, the process of receiving the results begins with the generative AI agent 160 completing its task of generating an answer based on the constrained information provided. This generated answer, along with any associated metadata, is then passed back to the topic scope AI agent 110. In an embodiment, the received results are structured in a standardized format, such as JSON or Protocol Buffers, to ensure consistent handling across different components of the system.

In an embodiment, upon receiving the results, the topic scope AI agent 110 performs several operations, including result validation, metadata enrichment, tenant association, or version. The AI agent 110 may check the integrity and format of the received data, ensuring it meets expected structures and contains all necessary fields. The AI agent 110 may append additional metadata to the results, such as generation timestamp, processing time, sources of information used, and confidence scores. The AI agent 110 may tag the results with the appropriate tenant identifier to maintain data isolation in the multi-tenant environment. The AI agent 110 may add version information, if applicable, to track different iterations of responses to similar queries.

In an embodiment, the storage process (operation 412A) involves persisting the received results in a manner that allows for efficient retrieval and analysis. This may include storing the results in main memory, in primary storage, in a search index, in vector storage, in a caching layer, or at another suitable storage location.

In an embodiment, the system presents the query results on an interface. This interface could be a graphical user interface (GUI) accessible through a web browser or a dedicated application. The presentation of results may include various elements such as the original query, the generated response, relevant topic maps used, and confidence scores. The interface may also feature interactive elements allowing users to explore the sources of information, request further clarification, or provide feedback on the relevance and accuracy of the results. Additionally, the system might employ data visualization techniques to represent complex relationships between topics or to highlight key insights from the generated response In an embodiment, the system transmits the query results to an endpoint associated with a user or user device as represented by the circle numbered six (7) in FIG. 1. The endpoint could be a variety of destinations, such as a mobile application, an email address, a messaging platform, or an API endpoint for integration with other systems. The transmission may occur through secure protocols like HTTPS to maintain data privacy and integrity. Depending on the user's preferences or system settings, the results could be pushed immediately or queued for scheduled delivery. The transmitted data package could include not only the primary query response but also associated metadata, confidence scores, and links to source materials. For endpoints with limited bandwidth or display capabilities, the system may optimize the content, sending a condensed version of the results with options to request more detailed information. Additionally, the transmission process could incorporate features like delivery confirmation and read receipts to ensure the query results have been successfully received and accessed by the intended recipient.

FIG. 4B illustrates steps of a method performed by the generative AI agent 160 for topic maps for constrained retrieval augmented generation (RAG) in accordance with an embodiment of the disclosure.

The process begins with the execution of a first sub-query on a set of topic maps (operation 402B). This initial step identifies a subset of topic maps that are relevant to the given query. To accomplish this, the system compares semantic vector embeddings generated for the query to semantic vector embeddings generated for summaries associated with the topic maps. It then selects a set of summaries that meet predetermined similarity criteria in relation to the query.

Following this initial filtering, the method proceeds to execute a second sub-query (operation 404B). This time, the focus is on a target set of content items that are mapped to the previously selected set of summaries. The goal of this step is to identify a portion of the target set of content items that will be used for generating query results. Similar to the first step, this is achieved by comparing semantic vector embeddings of the query to semantic vector embeddings of the target set of content items.

Once the relevant content items have been identified, the system generates query results (operation 406B). These results are based on the portion of the target set of content items identified in the previous step. This generation process involves synthesizing information from the selected content to produce a coherent and relevant response to the original query.

The final step of the method involves returning the generated query results to the topic scope AI agent 110 (operation 408B). This agent 110 then uses these results for further processing or presents them to the end-user as appropriate.

Figure 5:
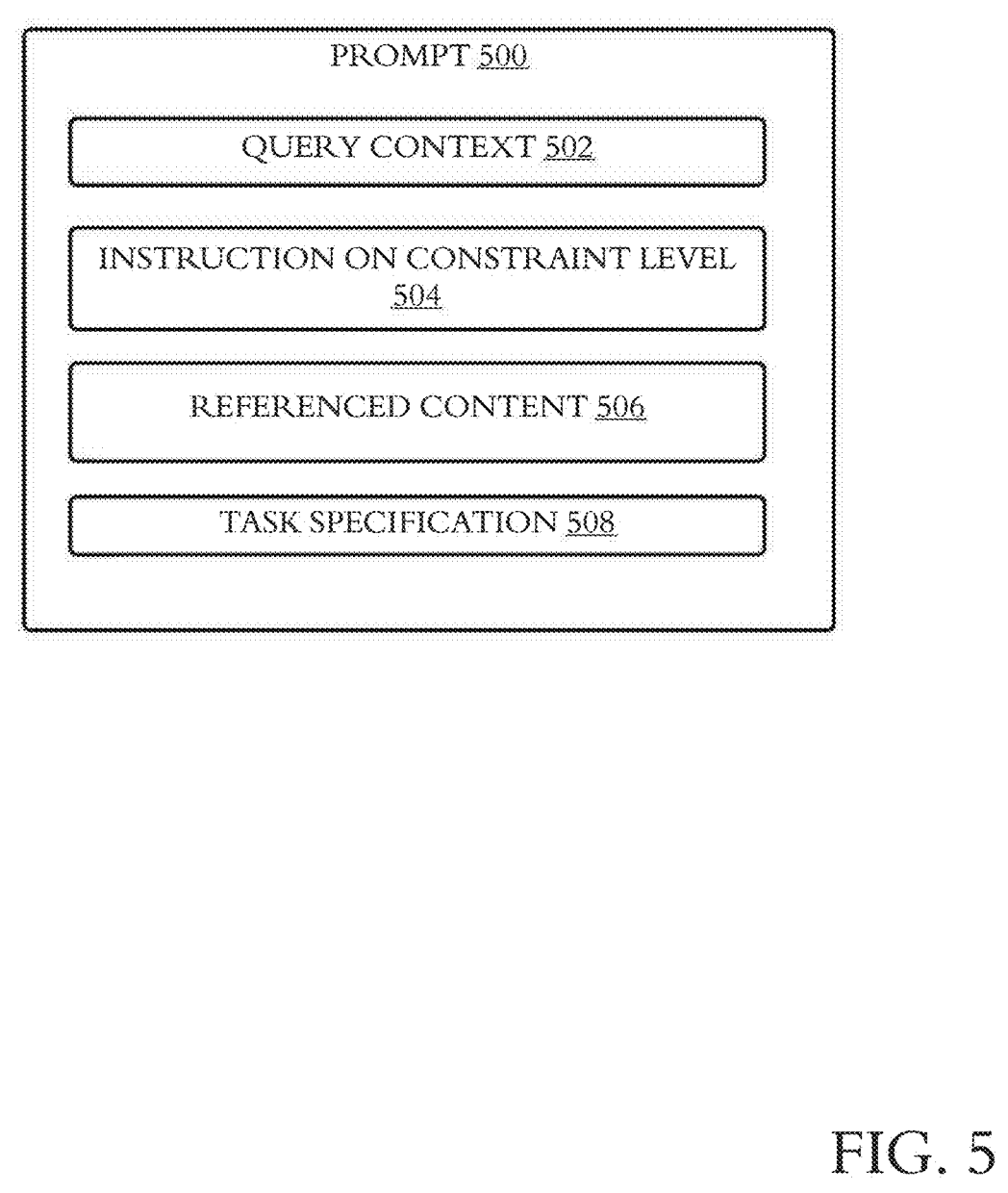

In an embodiment, as depicted in FIG. 5, the topic scope AI agent 110 constructs a prompt 500 with the following components: a query context 502 that encompasses the second query; an instruction on constraint level 504 that includes directions on how strictly the generative AI agent 160 is to adhere to the provided information; the referenced content 506 that includes the content items references from the selected subset of relevant content items or relevant excerpts or summaries from the referenced content items; and a task specification 508 that encompasses clear instructions on what the generative AI agent 160 should do with the referenced content 506.

FIG. 6 illustrates an example LLM prompt 600 that imposes a strict constraint level according to an embodiment of the present disclosure. The prompt 600 includes a query 602 and referenced content 604. For the purpose of providing a clear example, instead of references to the content, summaries or digests of the content are included in the prompt 600. The prompt 600 also includes a task specification with instructions on constraint level 606. This prompt 600 strictly constrains the generative AI agent 160 to use only the provided information, explicitly instructing it not to incorporate any external knowledge.

FIG. 7 illustrates an example LLM prompt 700 that substantially or mostly constrains the generative AI model 160 to the provided content according to an embodiment of the present disclosure. The prompt 700 includes a query 702 and referenced content 704. Again, for the purpose of providing a clear example, summaries or digest of the content are included in the prompt 700 instead of references to the content. The prompt 700 also includes a task specification with instructions on constraint level 706. This prompt allows the generative AI agent 160 more flexibility, permitting it to incorporate some additional context or general knowledge while still emphasizing the primacy of the provided information.

In an embodiment, the topic scope AI agent 110 includes additional metadata or structuring elements in the prompt to help the generative AI agent 160 organize its response. For example, the prompt may include any of the following: relevance scores for each piece of referenced content, tags or categories for different types of information, or specific formatting instructions for the output.

In an embodiment, the topic scope AI agent 110 implements a post-processing step to verify that the generated answer adheres to the specified constraints. This involves any of the following: semantic similarity analysis between the answer and the referenced content, fact-checking against the provided information, or calculating the proportion of the response that can be directly attributed to the referenced content.

By constructing these prompts, the topic scope AI agent 110 guides the generative AI agent 160 to produce responses that are appropriately constrained to the referenced content items, either strictly or substantially, while still allowing for coherent and informative answers to the user's queries.

The prepared query and relevant references are used to guide the LLM 165 in generating a response that is both relevant and constrained to the desired scope of information. This approach aims to leverage the strengths of large language models while mitigating some of their common weaknesses, such as hallucination or drift from the intended topic.

The approach allows for highly domain-specific responses by curating the references sent to the AI. By providing specific references, the topic scope AI agent 110 ensures the AI agent 160 works with the most relevant information. This can significantly reduce the chances of the AI generating irrelevant or incorrect information.

It should be noted that the AI agent 160 does not just retrieve pre-written answers but generates new responses based on the provided information. This allows for more flexible and context-appropriate answers.

The AI agent 160 can use its generative capabilities creatively but within the bounds of the provided references. This balance aims to maintain accuracy while allowing for nuanced and tailored responses. By scoping the response to specific content items, the topic scope AI agent 110 aims to minimize the AI agent 160's tendency to generate plausible but incorrect information (hallucination).

The AI agent 160 does not need to search through its entire knowledge base but can focus on the provided references. This can lead to faster response times and more efficient use of computational resources. The system can easily adapt to new or updated information by changing the references sent to the AI agent 160. This allows for up-to-date responses without needing to retrain the entire language model 165.

Since the AI agent 160's response is based on specific referenced content, it is easier to trace the sources of information used in generating the answer. The AI could potentially provide explanations or citations based on the specific content items it used to generate its response.

5. GUI Example

Figure 8:
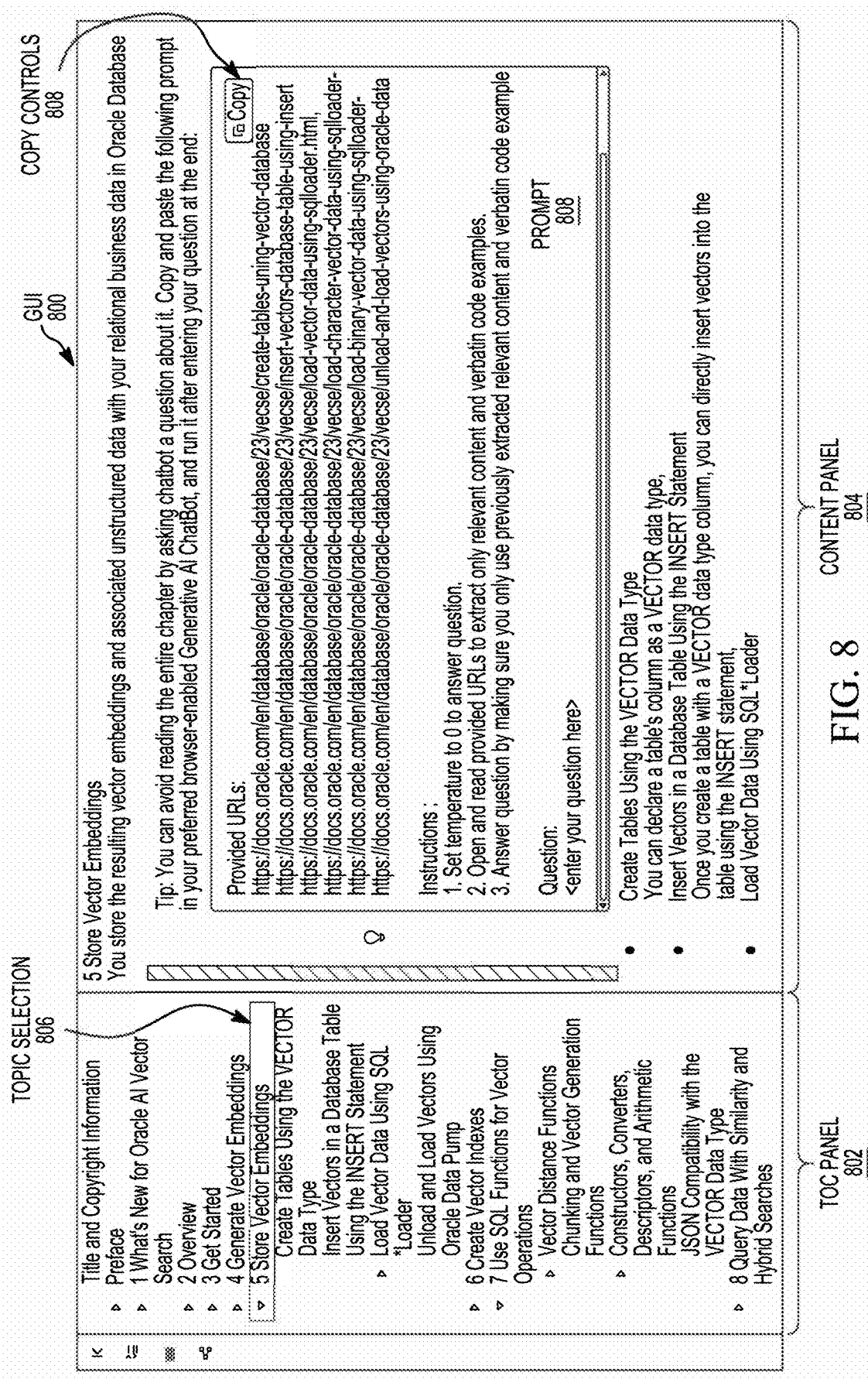
FIG. 8 illustrates a graphical user interface (GUI) designed to provide users with an intuitive and interactive way to navigate online documentation while also leveraging the power of generative AI according to an embodiment of the present disclosure.

FIG. 8 illustrates a graphical user interface (GUI) 800 designed to provide users with an intuitive and interactive way to navigate online documentation while also leveraging the power of generative AI according to an embodiment of the present disclosure. The GUI 800 is divided into two main panels, the Table of Contents (TOC) panel 802 and the content panel 804, both offering a familiar and efficient layout for browsing documentation.

The TOC panel 802 presents a hierarchical view of the documentation's structure, allowing users to easily navigate through different sections and topics. This panel employs a tree-like structure, with expandable and collapsible nodes representing chapters, sections, and subsections of the documentation. Users can click on any item in the TOC to select a topic of interest.

The content panel 804 dynamically displays the content of the currently selected topic 806 from the TOC panel 802. This panel renders the documentation content in a readable format, supporting rich text formatting, images, code snippets, and other multimedia elements relevant to technical documentation. As users navigate through different topics in the TOC panel 802, the content panel 804 updates in real-time to reflect the selected topic 806's information.

The content panel 804 incorporates a prompt template 808 in line with the documentation content. This prompt template 808 is automatically generated based on the topic map associated with the currently displayed topic. The topic map, a structured representation of the topic's key concepts and related information, serves as the foundation for creating a relevant and context-aware prompt template.

The prompt template 808 is designed to be easily copied and pasted into the user's preferred generative AI agent interface. The prompt template 808 includes content item references that are specific references to relevant sections or pieces of information from the topic map. They provide the AI agent with contextual information directly related to the current topic. The prompt template 808 includes task instructions that are directions on what the AI should do with the provided information, guiding it to generate relevant and focused responses. The prompt template 808 includes constraint level instructions that are guidelines on how strictly the AI should adhere to the provided information, allowing for varying degrees of creativity or strictness in the generated response. Instead of a predefined query, the prompt template 808 includes a clearly marked placeholder (e.g., "[INSERT YOUR QUERY HERE]"). This allows users to easily replace it with their specific question or prompt about the topic.

The prompt template 808 is visually distinct within the content panel 804, highlighted or enclosed in a bordered section to draw user attention. It offers a "Copy to Clipboard" controls 808 for easy one-click copying of the entire template.

This GUI design integrates traditional documentation browsing with AI-assisted information retrieval. Users can explore the documentation conventionally through the TOC and content panels, while also having the option to formulate more complex queries or seek additional insights by using the provided prompt template with a generative AI agent. This approach enhances the user's ability to interact with and extract value from the documentation, combining the structure of traditional documentation with the flexibility and power of AI-assisted information retrieval.

One or more embodiments extend GUI 800 by integrating direct submission capabilities for the prompt template 808 to a generative AI agent. This feature eliminates the need for manual copying and pasting, streamlining the process of obtaining AI-generated responses.

The GUI 800 is augmented with new user interface controls, strategically positioned near the prompt template 808. These controls trigger an interactive workflow for query submission. Upon activation, a modal dialog or an in-line input field appears, prompting the user to enter their specific query. The system then programmatically replaces the query placeholder in the template 808 with the user-provided input.

Following query insertion, the completed prompt is automatically transmitted to the integrated generative AI agent via an API call. This process occurs without requiring the user to switch contexts or navigate to external interfaces. The GUI 800 may display a loading indicator during the AI processing phase, ensuring users are aware of the ongoing operation.

Upon receiving the AI-generated response, the GUI 800 dynamically updates to present the results. This could involve expanding the content panel 804 or opening a new panel dedicated to AI responses. The displayed results maintain contextual relevance to the current documentation topic, enhancing the user's comprehension and exploration capabilities.

This extension transforms the GUI 800 into a more cohesive and efficient platform for documentation exploration and AI-assisted information retrieval. By automating the query submission process, one or more embodiments reduce cognitive load on users and accelerates the cycle of inquiry and discovery within the documentation interface.

6. Topic Maps with Content Item Summaries

In an embodiment, the topic maps 140 are structured to contain short summaries or descriptions of the content items 152 themselves rather than references to the content items 152. This approach is particularly useful in scenarios where the generative AI agent 160 is not configured to resolve or access external content item references directly. This design modification enhances the self-contained nature of the topic maps 140 and allows for more immediate use of the information by the AI agent 160.

In this embodiment, the topic forge 120 component of the multi-tenant provider network 100 is adapted to generate topic maps 140 with embedded content summaries. The process of creating these modified topic maps includes the topic forge 120 analyzing the target dataset(s) 150 to identify relevant topics and associated content items. Instead of simply storing references, the topic forge 120 employs NLP techniques to generate concise summaries of each relevant content item. This summarization can involve any of or a combination of extractive summarization techniques to select key sentences from the original content, abstractive summarization techniques using machine learning, such as sequence-to-sequence-based mode, a transformer-based model, a LLM fine-tuned for summarization tasks, or entity and key concept extraction to ensure salient information is captured in the summary.

In an embodiment, the topic forge 120 generates and includes information in the topic maps 140 in addition to the content item summaries, such as the original content's title, author, creation date, and a confidence score for the summary's accuracy. Additionally, or alternatively, topic structuring information is included that organizes the summaries within the topic map structure, associating the summaries with their relevant topics.

The topic vault 130 is adapted to store these enhanced topic maps that now contain both the topic information or references and the content summaries. This modification increases the storage requirements for the topic vault 130 but provides several advantages. Each topic map now contains actual content snippets, making it a more self-sufficient unit of information. The need for resolving external references is eliminated, potentially improving response times. The generative AI agent 160 can work directly with the provided summaries without needing to access or process external content. The topic scope AI agent 110's operation is also modified. When it receives a query and identifies relevant topic maps, it now has immediate access to content summaries. This allows it to construct more informative prompts for the generative AI agent 160.

FIG. 9 illustrates an example prompt template 900 used by the topic scope AI agent 110 according to an embodiment of the present disclosure. In this example, before transmitting a prompt based on the prompt template 900 to the generative AI agent 160, the topic scope AI agent 110 would replace the "[User's query]" placeholder with an actual query, replace the "[Topic]" with a name of the current topic, and replace the "Brief summary of content item 1", etc., with the actual generated summaries of content items for the current topic.

This approach offers several benefits. The generative AI agent 160 has immediate access to relevant information, improving its ability to provide accurate and contextual responses. Since the AI agent 160 is working from curated summaries, there is potentially greater consistency in responses across queries. Users can be more easily informed about the exact information sources used to generate responses.

7. Content Item Relevance Rankings/Scoring

In an embodiment, topic maps are enhanced with a ranking or scoring system for content item references or summaries, reflecting their relevance to the corresponding topic or the given query. This approach allows the generative AI agent 160 to prioritize the most pertinent information when formulating responses, potentially improving the accuracy and relevance of its outputs.

In an embodiment, the topic forge 120 is enhanced to include a relevance scoring algorithm. This algorithm employs one or more techniques, such as TF-IDF (Term Frequency-Inverse Document Frequency) scoring, to measure the importance of content items to a topic; semantic similarity measures using word embeddings or sentence transformers to calculate the closeness of content to the topic; or machine learning models trained on expert-labeled data to predict relevance scores. In an embodiment, for query-specific relevance, the topic scope AI agent 110 employs a real-time scoring system that evaluates content items against the current query.

In an embodiment, the topic maps stored in the topic vault 130 are modified to include relevance scores for each content item reference or summary. FIG. 10 illustrates an example data structure format 1000 for representing topic maps in the topic vault, according to an embodiment of the present disclosure.

In an embodiment, the topic scope AI agent 110 implements a system to dynamically adjust relevance scores based on the specific query. This involves re-ranking content items based on their similarity to the query and combining precomputed topic relevance with query-specific relevance.

In an embodiment, when the topic scope AI agent 110 constructs the prompt for the generative AI agent 160, it incorporates the relevance information. FIG. 11 illustrates an example prompt template 1100 that provides a placeholder for an actual query and incorporates relevant information according to an embodiment of the present disclosure. In this example, the task instructions for the generative AI agent 160 command the AI agent 160 to pay particular attention to content items with a relevance score above a threshold (0.8 in this example) when generating the answer to the query.

The generative AI agent 160 is specifically instructed to consider the relevance scores when crafting its response. This involves any of prioritizing information from higher-scored content items, using lower-scored items only for supplementary details or context, or potentially ignoring very low-scored items unless necessary.

In an embodiment, the generative AI agent 160 implements a weighted information synthesis approach. For example, information from content items with scores >0.9 might be considered crucial and always included, whereas content scored between 0.7-0.9 might be used for supporting details, and content below 0.7 might only be used if directly relevant to a specific part of the query not covered by higher-scored items.

In an embodiment, a feedback mechanism is implemented where the effectiveness of the relevance-based prioritization is evaluated based on user interactions or feedback. This data is used to refine the relevance scoring algorithm over time.

In an embodiment, the generative AI agent 160 is instructed to indicate the relevance scores of the information it uses in its response, providing transparency to the end-user about the source and perceived importance of different pieces of information.

The ranking-based approach offers several advantages. By prioritizing highly relevant content, the system can generate more focused and pertinent answers. The AI can quickly identify the most important information, potentially reducing processing time and improving response speed. The system can adapt to different queries by dynamically adjusting relevance based on the specific question asked. Users can understand the information that was considered most relevant to their query.

8. Extensions and Alternatives

In an embodiment, the topic scope AI agent 110 adopts a multi-step prompting strategy when interacting with the generative AI agent 160. Instead of sending the instructions and information in a single, comprehensive prompt, the agent 110 divides the communication into multiple, distinct prompts. This approach leverages the capability of many advanced language models to maintain context across multiple interactions, allowing for a more structured and potentially more effective use of the AI's capabilities.

In an embodiment, the topic scope AI agent 110 begins by sending a system prompt to the generative AI agent 160. This prompt sets the stage for the interaction and provides foundational information. It includes any of content item references or summaries from the relevant topic maps, general instructions on how to use this information, any constraints or guidelines for information usage, or metadata about the topics or content items such as relevance scores.

Following the system prompt, the topic scope AI agent 110 sends a user prompt. This prompt contains any of the specific query to be answered, any query-specific instructions or constraints, or guidance on how to format or structure the response.

In an embodiment, depending on the complexity of the query or the AI 160's initial response, the topic scope AI agent 110 sends additional prompts. These could include requests for clarification or expansion on specific points, instructions to consider additional perspectives or information, or guidance to refine or restructure the response.

In an embodiment, the architecture of the system is modified to accommodate a separation between the topic scope AI agent 110 and the generative AI agent 160. Instead of being part of the same provider network 100, the generative AI agent 160 is offered by a third-party service that the topic scope AI agent 110 integrates with. This arrangement allows for greater flexibility in leveraging specialized AI capabilities while maintaining the core functionality of the topic-scoped query processing system.

In this setup, the multi-tenant provider network 100 remains responsible for managing topic maps, processing queries, and orchestrating the overall workflow. However, when it comes to generating the final response, the topic scope AI agent 110 makes API calls to the external generative AI service.

In an embodiment, the topic scope AI agent 110 is adapted to operate on edge devices, such as end-users' computing devices, rather than solely within the centralized multi-tenant provider network 100. This approach brings the query processing and topic-scoped information retrieval closer to the user, offering advantages in terms of latency, privacy, and distributed computing capabilities.

9. Hardware Overview

According to an embodiment, the techniques described herein are implemented by one or more special-purpose electronic computing devices. The one or more special-purpose electronic computing devices may be hard-wired to collectively perform the techniques, or they may encompass one or more digital electronic computing devices, such as one or more application-specific integrated circuits (ASICs), one or more field programmable gate arrays (FPGAs), or one or more network processing units that are persistently programmed to collectively perform the techniques.

Furthermore, the one or more special-purpose electronic computing devices may include one or more general-purpose hardware processors programmed to collectively perform the techniques pursuant to program instructions in firmware, memory, other storage, or a combination. Such one or more special-purpose electronic computing devices may also combine custom hard-wired logic, ASICs, FPGAs, or NPUs with custom programming to collectively perform the techniques.

The one or more special-purpose electronic computing devices may encompass any electronic computing device suitable for implementing the techniques. For example, the one or more special-purpose electronic computing device may encompass any of a desktop electronic computing device, a portable electronic computing device, a handheld electronic computing device, a server electronic computing device, a networking electronic computing device, or any other electronic computing device that incorporates hard-wired or program logic to implement the techniques.

Figure 12:
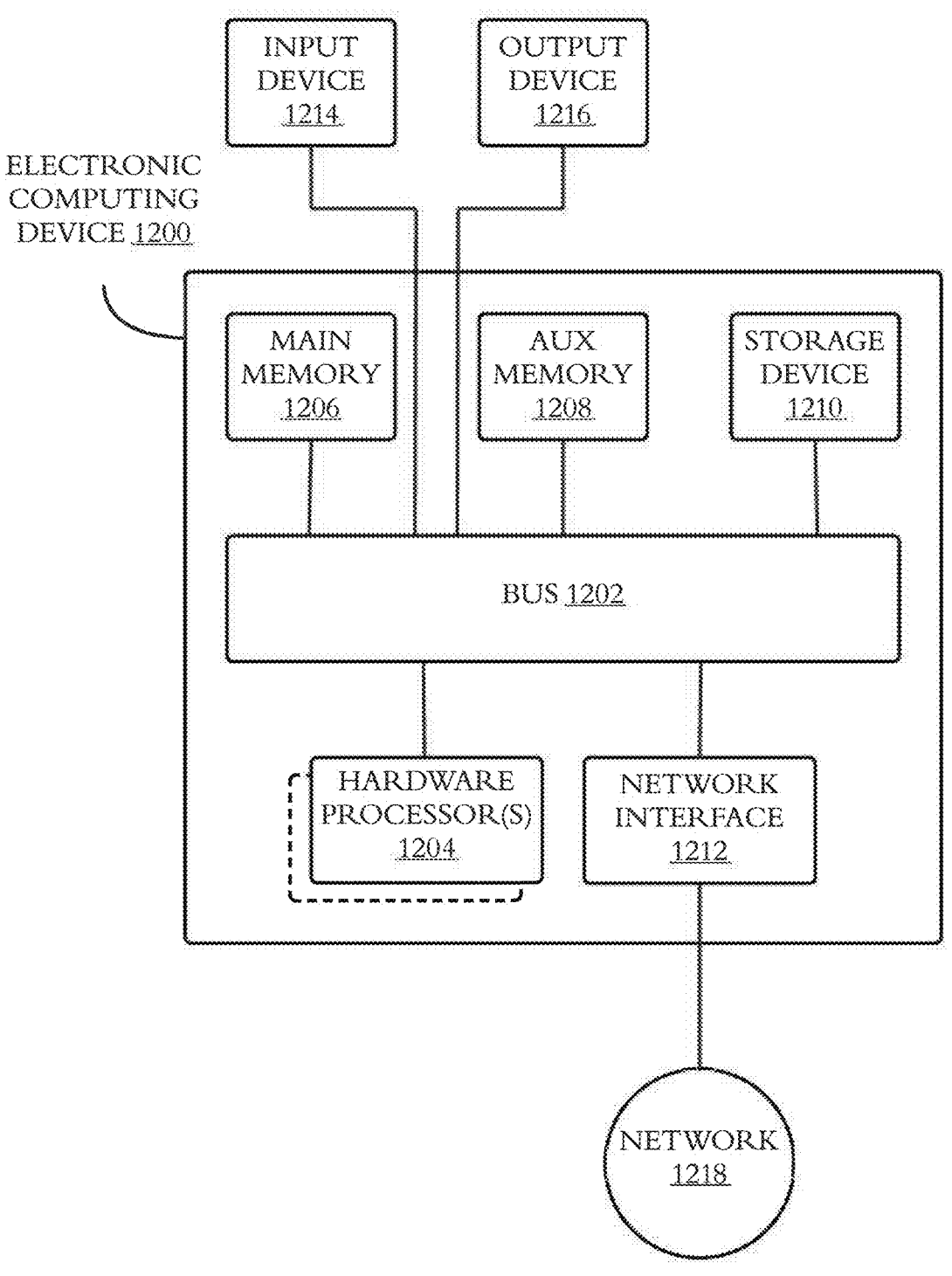
FIG. 12 shows a block diagram that illustrates a computer system for use in an implementation of LLM query management in accordance with an embodiment.

In an embodiment, the techniques described herein are implemented at least in part by one or more electronic computing devices. FIG. 12 illustrates an example of a device 1200 for implementing the techniques described herein. Example device 1200 includes electronic components encompassing hardware or hardware and software including bus 1202, one or more hardware processors 1204, main memory 1206, ROM 1208, storage device 1210, and network interface 1212.

While only instance of an electronic component may be depicted in FIG. 12 for the purpose of providing a clear example, multiple instances of a component are present in device 1200 in some instances. For example, in an embodiment, multiple hardware processors (including, potentially, different types of processors) are connected to bus 1202. Accordingly, unless the context clearly indicates otherwise, reference with respect to FIG. 12 to a component of device 1200 in the singular such as, for example, processor 1204, is not intended to exclude the plural where, in a particular instance of device 1200, multiple instances of the component are present. Further, some components might not be present in a particular instance of device 1200. For example, device 1200 in a headless configuration such as, for example, when operating as a server racked in a data center, might not include, or be connected to, input device 1214 or output device 1216.

In an embodiment, the one or more hardware processors 1204 collectively execute computer-executable instructions including instructions for performing the techniques described herein. The one or more processors 1204 collectively fetch, decode, and execute instructions from main memory 1206 and collectively perform arithmetic and logic operations dictated by instructions and collectively coordinate the activities of other electronic components of device 1200 in accordance with instructions. The one or more processors 1204 are made using silicon wafers according to a manufacturing process (e.g., 7 nm, 5 nm, or 3 nm). The one or more processors 1204 are configured to understand and execute a set of commands referred to as an instruction set architecture (ISA) (e.g., x86, x86_64, or ARM).

In an embodiment, the one or more hardware processors 1204 collectively encompass a cache used to store frequently accessed computer-executable instructions to speed up processing. In an embodiment, the one or more hardware processors 1204 collectively encompass multiple layers of cache (L1, L2, L3) with varying speeds and sizes.

In an embodiment, the one or more hardware processors 1204 collectively encompass multiple cores where each such core is a processor within processor 1204. The cores allow the one or more processors 1204 to collectively process multiple computer-executable instructions at once in a parallel processing manner.

In an embodiment, the one or more hardware processors 1204 support multithreading where each core of the one or more processors 1204 handles multiple threads (multiple sequences of computer-executable instructions) at once to further enhance parallel processing capabilities.

In an embodiment, a hardware processor 1204 is any of the following types of Central Processing Units (CPUs): a desktop processor for general computing, gaming, content creation, etc.; a server processor for data centers, enterprise-level applications, cloud services, etc.; a mobile processor for portable computing devices like laptops and tablets for enhanced battery life and thermal management; a workstation processor for intense computational tasks like 3D rendering and simulations; or any other type of CPU suitable for the particular implementation at hand.

While a hardware processor 1204 might be a CPU, a processor 1204, in an embodiment, is any of the following types of processors: a Graphics Processing Unit (GPU) capable of highly parallel computation allowing for processing of multiple calculations simultaneously and useful for rendering images and videos and for accelerating machine learning computation tasks; a Digital Signal Processor (DSP) designed to process analog signals like audio and video signals into digital form and vice versa, commonly used in audio processing, telecommunications, and digital imaging; specialized hardware for machine learning workloads, especially those involving tensors (multi-dimensional arrays); a Field-Programmable Gate Array (FPGA) or other reconfigurable integrated circuit that is customized post-manufacturing for specific applications, such as cryptography, data analytics, and network processing; a Neural Processing Unit (NPU) or other dedicated hardware designed to accelerate neural network and machine learning computations, commonly found in mobile devices and edge computing applications; an Image Signal Processor (ISP) specialized in processing images and videos captured by cameras, adjusting parameters like exposure, white balance, and focus for enhanced image quality; an Accelerated Processing Unit (APU) combing a CPU and a GPU on a single chip to enhance performance and efficiency, especially in consumer electronics like laptops and consoles; a Vision Processing Unit (VPU) dedicated to accelerating machine vision tasks such as image recognition and video processing, typically used in drones, cameras, and autonomous vehicles; a Microcontroller Unit (MCU) or other integrated processor designed to control electronic devices, containing CPU, memory, and input/output peripherals; an embedded processor for integration into other electronic devices such as washing machines, cars, industrial machines, etc.; a System On a Chip (SoC) such as those commonly used in smartphones encompassing a CPU integrated with other components like a GPU and memory on a single chip; or any other type of hardware processor suitable for the particular implementation at hand.

Main memory 1206 is an electronic component that stores data and computer-executable instructions that the one or more hardware processors 1204 collectively execute. In an embodiment, main memory 1206 provides the space for the operating system, applications, and data in current use to be quickly reached by the one or more processors 1204. In an embodiment, main memory 1206 is a random-access memory (RAM) that allows data items to be read or written in substantially the same amount of time irrespective of the physical location of the data items inside main memory 1206.

In an embodiment, main memory 1206 is a volatile or non-volatile memory. Data stored in a volatile memory is lost when the power is turned off. Data in non-volatile memory remains intact even when the system is turned off. In an embodiment, main memory 1206 is Dynamic RAM (DRAM). DRAM such as Single Data Rate RAM (SDRAM) or Double Data Rate RAM (DDRAM) is volatile memory that stores each bit of data in a separate capacitor within an integrated circuit. The capacitors of DRAM leak charge and need to be periodically refreshed to avoid information loss. In an embodiment, main memory 1206 is Static RAM (SRAM). SRAM is volatile memory that is typically faster but more expensive than DRAM. SRAM uses multiple transistors for each memory cell but does not need to be periodically refreshed. Additionally, or alternatively, SRAM is used for cache memory in processor 1204 in an embodiment. In an embodiment, main memory 1206 encompasses both DRAM and SRAM.

In an embodiment, device 1200 has auxiliary memory 1208 other than main memory 1206. Examples of auxiliary memory 1208 include cache memory, register memory, read-only memory (ROM), secondary storage, virtual memory, memory controller, and graphics memory. In an embodiment, device 1200 has multiple auxiliary memories including different types of auxiliary memories.

Cache memory is found inside or very close to the one or more hardware processors 1204 and is typically faster but smaller than main memory 1206. Cache memory is used to hold frequently accessed computer-executable instructions and associated data to speed up processing. In an embodiment, cache memory is hierarchical ranging from Level 1 cache memory which is the smallest but fastest cache memory and is typically located inside the one or more processors 1204 to Level 2 and Level 3 cache memory which are progressively larger and slower cache memories that are located inside or outside the one or more processors 1204.

Register memory is a small but very fast storage location within the one or more hardware processors 1204 designed to hold data temporarily for ongoing operations.

ROM is a non-volatile memory device that is only read, not written to. In an embodiment, ROM is a Programmable ROM (PROM), Erasable PROM (EPROM), or electrically erasable PROM (EEPROM). In an embodiment, ROM stores basic input/output system (BIOS) instructions which help device 1200 boot up.

Secondary storage is a non-volatile memory. In an embodiment, secondary storage encompasses any of: a hard disk drive (HDD) or other magnetic disk drive device; a solid-state drive (SSD) or other NAND-based flash memory device; an optical drive like a CD-ROM drive, a DVD drive, or a Blu-ray drive; or flash memory device such as a USB drive, an SD card, or other flash storage device.

Virtual memory is a portion of a hard drive or an SSD that the operating system uses as if it were main memory 1206. When main memory 1206 gets filled, less frequently accessed data and computer-executable instructions are "swapped" out to the virtual memory. The virtual memory is slower than main memory 1206, but it provides the illusion of having a larger main memory 1206.

A memory controller manages the flow of data and computer-executable instructions to and from main memory 1206. The memory controller is located either on the motherboard of device 1200 or within the one or more hardware processors 1204.

Graphics memory is used by a graphics processing unit (GPU) and is specially designed to handle the rendering of images, videos, graphics, or performing machine learning calculations. Examples of graphics memory include graphics double data rate (GDDR) such as GDDR5 and GDDR6.

Storage device 1210 is an electronic component used to store data and computer-executable instructions. In an embodiment, storage device 1210 is non-volatile memory. Examples of storage device 1210 include a hard disk drive (HDD), a solid-state drive (SDD), an optical drive, a flash memory device, a magnetic tape drive, a floppy disk, an external drive, or a RAID array device.

In an embodiment, storage device 1210 is additionally or alternatively connected to device 1200 via network 1226. In an embodiment, storage device 1210 encompasses a network attached storage (NAS) device, a storage area network (SAN) device, a cloud storage device, or a centralized network filesystem device.

Network interface 1212 (sometimes referred to as a network interface card, NIC, network adapter, or network interface controller) is an electronic component that connects device 1200 to network 1226. Network interface 1212 functions to facilitate communication between device 1200 and network 1226. Examples of a network interface 1212 include an ethernet adaptor, a wireless network adaptor, a fiber optic adapter, a token ring adaptor, a USB network adaptor, a Bluetooth adaptor, a modem, a cellular modem or adapter, a powerline adaptor, a coaxial network adaptor, an infrared (IR) adapter, an ISDN adaptor, a VPN adaptor, and a TAP/TUN adaptor.

Bus 1202 is an electronic component that transfers data between other electronic components of or connected to device 1200. Bus 1202 serves as a shared highway of communication for data and computer-executable instructions, providing a pathway for the exchange of information between components within device 1200 or between device 1200 and another device. Bus 1202 connects the different parts of device 1200 to each other. In an embodiment, bus 1202 encompasses one or more of: a system bus, a front-side bus, a data bus, an address bus, a control bus, an expansion bus, a universal serial bus (USB), a I/O bus, a memory bus, an internal bus, an external bus, and a network bus.

Computer-executable instructions for implementing the techniques described herein may take different forms. In an embodiment, the computer-executable instructions are in a low-level form such as binary instructions, assembly language, or machine code according to an instruction set (e.g., x86, ARM, MIPS) that the one or more hardware processors 1204 are designed to collectively process. In an embodiment, the computer-executable instructions include individual operations that the one or more hardware processors 1204 is designed to collectively perform such as arithmetic operations (e.g., add, subtract, multiply, divide, etc.); logical operations (e.g., AND, OR, NOT, XOR, etc.); data transfer operations including moving data from one location to another such as from main memory 1206 into a register of the one or more hardware processor 1204 or from a register to main memory 1206; control instructions such as jumps, branches, calls, and returns; comparison operations; and specialization operations such as handling interrupts, floating-point arithmetic, and vector and matrix operations. In an embodiment, the computer-executable instructions are in a higher-level form such as programming language instructions in a high-level programming language such as Python, Java, C++, etc. In an embodiment, the computer-executable instructions are in an intermediate level form in between a higher-level form and a low-level form such as bytecode or an abstract syntax tree (AST).

Computer-executable instructions for implementing the techniques described herein may be in different forms at the same or different times. In an embodiment, when stored in storage device 1210 or main memory 1206, the computer-executable instructions are stored in a higher-level form such as Python, Java, or other high-level programing language instructions, in an intermediate-level form such as Python or Java bytecode that is compiled from the programming language instructions, or in a low-level form such as binary code or machine code. In an embodiment, when stored in the one or more hardware processors 1204, the computer-executable instructions are stored in a low-level form such as binary instructions, assembly language, or machine code according to an instruction set architecture (ISA). In an embodiment, the computer-executable instructions are stored in the one or more hardware processors 1204 in an intermediate level form or even a high-level form where the one or more hardware processors 1204 are capable of collectively executing computer-executable instructions in such form.

Computer-executable instructions for implementing the techniques described herein may be collectively executed by the one or more hardware processors 1204 according to a processing model such as any of the following processing models: sequential execution where computer-executable instructions are processed one after another in a sequential manner; pipelining where pipelines are used to process multiple instruction phases concurrently; multiprocessing where different processors execute different computer-executable instructions concurrently, sharing the workload; thread-level parallelism where multiple threads run in parallel across different processors; simultaneous multithreading or hyperthreading where a single processor processes multiple threads simultaneously, making it appear as multiple logical processors; multiple instruction issue where multiple instruction pipelines allow for the processing of several computer-executable instructions during a single clock cycle; parallel data operations where a single computer-executable instruction is used to perform operations on multiple data elements concurrently; clustered or distributed computing where multiple processors in a network (e.g., in the cloud) collaboratively process the computer-executable instructions, distributing the workload across the network; graphics processing unit (GPU) acceleration where GPUs with their many processors allow the processing of numerous threads in parallel, suitable for tasks like graphics rendering and machine learning; asynchronous execution where processing of computer-executable instructions is driven by events or interrupts, allowing the one or more processors to handle tasks asynchronously; concurrent instruction phases where multiple instruction phases (e.g., fetch, decode, execute) of different computer-executable instructions are handled concurrently; parallel task processing where different processors handle different tasks or different parts of data, allowing for concurrent processing and execution; or any other processing model suitable to meet the requirements of the particular implementation at hand.

Input device 1214 is an electronic component that allows users to feed data and control signals into device 1200. Input device 1214 translates a user's action or the data from the external world into a form that device 1200 processes. Examples of input device 1214 include a keyboard, a pointing device (e.g., a mouse), a touchpad, a touchscreen, a microphone, a scanner, a webcam, a joystick/game controller, a graphics tablet, a digital camera, a barcode reader, a biometric device, a sensor, and a MIDI instrument.

Output device 1216 is an electronic component that conveys information from device 1200 to the user or to another device. The information is in the form of text, graphics, audio, video, or other media representation. Examples of output device 1216 include a monitor or display device, a printer device, a speaker device, a headphone device, a projector device, a plotter device, a braille display device, a haptic device, a LED or LCD panel device, a sound card, and a graphics or video card.

Network 1218 is a collection of interconnected computers, servers, and electronic computing devices that allow for the sharing of resources and information. Network 1218 ranges in size from just two connected devices one of which is device 1200 to a global network (e.g., the internet) with many interconnected devices. In an embodiment, network 1218 encompasses network devices such as routers, switches, hubs, modems, and access points.

Individual devices on network 1218 are sometimes referred to as "network nodes." Network nodes communicate with each other through mediums or channels sometimes referred to as "network communication links." The network communication links are wired (e.g., twisted-pair cables, coaxial cables, or fiber-optic cables) or wireless (e.g., Wi-Fi, radio waves, or satellite links). Network nodes follow a set of rules sometimes referred to "network protocols" that define how the network nodes communicate with each other.

Example network protocols include data link layer protocols such as Ethernet and Wi-Fi, network layer protocols such as IP (Internet Protocol), transport layer protocols such as TCP (Transmission Control Protocol), application layer protocols such as HTTP (Hypertext transfer Protocol) and HTTPS (HTTP Secure), and routing protocols such as OSPF (Open Shortest Path First) and BGP (Border Gateway Protocol).

Network 1218 has a particular physical or logical layout or arrangement sometimes referred to as a "network topology." Example network topologies include bus, star, ring, and mesh. In an embodiment, network 1218 encompasses any of the following categories of networks: a personal area network (PAN) that covers a small area (a few meters), like a connection between a computer and a peripheral device via Bluetooth; a local area network (LAN) that covers a limited area, such as a home, office, or campus; a metropolitan area network (MAN) that covers a larger geographical area, like a city or a large campus; a wide area network (WAN) that spans large distances, often covering regions, countries, or even globally (e.g., the internet); a virtual private network (VPN) that provides a secure, encrypted network that allows remote devices to connect to a LAN over a WAN; an enterprise private network (EPN) build for an enterprise, connecting multiple branches or locations of a company; or a storage area network (SAN) that provides specialized, high-speed block-level network access to storage using high-speed network links like Fibre Channel.

10. Terminology

As used herein and in the appended claims, the term "computer-readable media" refers to one or more mediums or devices that store or transmit information in a format that a computer system accesses. Computer-readable media encompasses both storage media and transmission media. Storage media includes volatile and non-volatile memory devices such as RAM devices, ROM devices, secondary storage devices, register memory devices, memory controller devices, graphics memory devices, and the like. Transmission media includes wired and wireless physical pathways that carry communication signals such as twisted pair cable, coaxial cable, fiber optic cable, radio waves, microwaves, infrared, visible light communication, and the like.

As used herein and in the appended claims, the term "non-transitory computer-readable media" encompasses computer-readable media as just defined but excludes transitory, propagating signals. Data stored on non-transitory computer-readable media is not just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device"

could be termed a "second device." The first and second devices can be the same or different devices.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, unless otherwise clear in context, phrases such as "a device configured to" are intended to include one or more recited devices. Such one or more recited devices, unless otherwise clear in context, are collectively configured to carry out the stated recitations. For example, "a processor configured to carry out recitations A, B and C" encompasses both (a) a single processor configured to carry out recitations A, B, and C and (b) a first processor configured to carry out recitation A working in conjunction with a second processor configured to carry out recitations B and C.

Unless otherwise clear in context, the terms "set," and "collection" should generally be interpreted to include one or more described items throughout this application. Accordingly, unless otherwise clear in context, phrases such as "a set of devices configured to" or "a collection of devices configured to" are intended to include one or more recited devices. Such one or more recited devices, unless otherwise clear in context, are collectively configured to carry out the stated recitations. For example, "a set of servers configured to carry out recitations A, B and C" encompasses both (a) a single server configured to carry out recitations A, B, and C and (b) a first server configured to carry out recitations A and B working in conjunction with a second server configured to carry out recitation C.

As used herein, unless otherwise clear in context, the term "or" is open-ended and encompasses all possible combinations, except where infeasible. For example, if it is stated that a component includes A or B, then, unless infeasible or otherwise clear in context, the component includes at least A, or at least B, or at least A and B. As a second example, if it is stated that a component includes A, B, or C then, unless infeasible or otherwise clear in context, the component includes at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. is either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical (e.g., a condition precedent) or causal connection or association between two stated things where one of the things is the basis for or informs the other without requiring or foreclosing additional unstated things that affect the logical or casual connection or association between the two stated things.

Unless the context clearly indicates otherwise, the relational term "in response to" or "responsive to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

In the foregoing specification, one or more embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. One or more non-transitory computer-readable media comprising computer-executable instructions that, when executed by one or more hardware processors, causes one or more electronic computing devices to perform:

receiving a first query;

identifying, from among a set of topic maps for a set of one or more target datasets, a subset of one or more topic maps; wherein each topic map of the subset of one or more topic maps indicates a respective topic of the set of one or more target datasets and a respective plurality of references to a respective plurality of content items of the one or more target datasets that are relevant to the respective topic;

generating a hallucination reduced response from a generative artificial intelligence agent comprising a large language model, wherein generating the hallucination reduced response comprises:

generating a prompt for the large language model, wherein the prompt comprises:

a second query; wherein the second query is the first query or is generated based on the first query;

the respective plurality of references to the respective plurality of content items of each topic map of the subset of one or more topic maps; and instructions for the generative artificial intelligence agent to generate an answer to the second query using information from the content items referred to be the respective plurality of references;

transmitting the prompt to the generative artificial intelligence agent;

receiving a set of one or more results for the second query; and storing the set of one or more results for the second query.

2. The one or more non-transitory computer-readable media of claim 1, wherein identifying the subset of one or more topic maps comprises:

generating a vector representation of the second query;

comparing the vector representation of the second query to one or more respective vector representations of each topic map in the subset of one or more topic maps; and selecting the subset of one or more topic maps based on one or more similarity measures for the vector representation of the second query and the one or more respective vector representations of each topic map in the subset of one or more topic maps.

3. The one or more non-transitory computer-readable media of claim 1, wherein the set of topic maps is generated by performing:

analyzing content of the set of one or more target datasets to identify a plurality of topics;

for each topic of the plurality of topics:

generating a topic description based on content items in the set of one or more target datasets that are relevant to the topic;

identifying a set of references to content items in the set of one or more target datasets that are relevant to the topic; and creating a topic map comprising the topic, the topic description, and the set of references; and wherein the set of topic maps comprises the topic maps created for the plurality of topics.

4. The one or more non-transitory computer-readable media of claim 1, wherein:

each topic map of the subset of one or more topic maps comprises, for each reference of the respective plurality of references to the respective plurality of content items, a corresponding relevance score indicating a degree of relevance of the referenced content item to the respective topic of the topic map;

transmitting the prompt to the generative artificial intelligence agent comprises transmitting the corresponding relevance scores associated with the respective plurality of references; and the computer-executable instructions, when executed, further cause the one or more electronic computing devices to perform:

instructing the generative artificial intelligence agent to consider the corresponding relevance scores when generating the answer to the second query.

5. The one or more non-transitory computer-readable media of claim 1, wherein the instructions for the generative artificial intelligence agent to generate the answer to the second query use only information from the content items referred to by the respective plurality of references.

6. The one or more non-transitory computer-readable media of claim 1, wherein the instructions for the generative artificial intelligence agent to generate the answer to the second query use mostly information from the content items referred to by the respective plurality of references.

7. The one or more non-transitory computer-readable media of claim 1, wherein:

each topic map of the subset of one or more topic maps comprises, for each reference of the respective plurality of references to the respective plurality of content items, a corresponding content item summary;

the computer-executable instructions, when executed, further cause the one or more electronic computing devices to perform:

transmitting the respective plurality of content item summaries of the respective plurality of content items of each topic map of the subset of one or more topic maps to the generative artificial intelligence agent; and instructing the generative artificial intelligence agent to use the respective plurality of content item summaries to generate an answer to the second query.

8. A method comprising:

receiving a first query;

identifying, from among a set of topic maps for a set of one or more target datasets, a subset of one or more topic maps; wherein each topic map of the subset of one or more topic maps indicates a respective topic of the set of one or more target datasets and a respective plurality of references to a respective plurality of content items of the one or more target datasets that are relevant to the respective topic;

generating a hallucination reduced response from a generative artificial intelligence agent comprising a large language model, wherein generating the hallucination reduced response comprises:

generating a prompt for the large language model, wherein the prompt comprises:

a second query; wherein the second query is the first query or is generated based on the first query;

the respective plurality of references to the respective plurality of content items of each topic map of the subset of one or more topic maps; and instructions for the generative artificial intelligence agent generate an answer to the second query using information from the content items referred to be the respective plurality of references;

transmitting the prompt to the generative artificial intelligence agent;

receiving a set of one or more results for the second query; and storing the set of one or more results for the second query.

9. The method of claim 8, wherein identifying the subset of one or more topic maps comprises:

generating a vector representation of the second query;

comparing the vector representation of the second query to one or more respective vector representations of each topic map in the subset of one or more topic maps; and selecting the subset of one or more topic maps based on one or more similarity measures for the vector representation of the second query and the one or more respective vector representations of each topic map in the subset of one or more topic maps.

10. The method of claim 8, wherein the set of topic maps is generated by performing:

analyzing content of the set of one or more target datasets to identify a plurality of topics;

for each topic of the plurality of topics:

generating a topic description based on content items in the set of one or more target datasets that are relevant to the topic;

identifying a set of references to content items in the set of one or more target datasets that are relevant to the topic; and creating a topic map comprising the topic, the topic description, and the set of references; and wherein the set of topic maps comprises the topic maps created for the plurality of topics.

11. The method of claim 8, wherein:

each topic map of the subset of one or more topic maps comprises, for each reference of the respective plurality of references to the respective plurality of content items, a corresponding relevance score indicating a degree of relevance of the referenced content item to the respective topic of the topic map;

transmitting the prompt to the generative artificial intelligence agent comprises transmitting the corresponding relevance scores associated with the respective plurality of references; and the method further comprises:

instructing the generative artificial intelligence agent to consider the corresponding relevance scores when generating the answer to the second query.

12. The method of claim 8, wherein the instructions for the generative artificial intelligence agent to generate the answer to the second query use only information from the content items referred to by the respective plurality of references.

13. The method of claim 8, wherein the instructions for the generative artificial intelligence agent to generate the answer to the second query use mostly information from the content items referred to by the respective plurality of references.

14. The method of claim 8, wherein:

each topic map of the subset of one or more topic maps comprises, for each reference of the respective plurality of references to the respective plurality of content items, a corresponding content item summary;

the method further comprises:

transmitting the respective plurality of content item summaries of the respective plurality of content items of each topic map of the subset of one or more topic maps to the generative artificial intelligence agent; and instructing the generative artificial intelligence agent to use the respective plurality of content item summaries to generate an answer to the second query.

15. A system comprising:

one or more hardware processors; and computer-executable instructions stored in one or more non-transitory computer-readable media that, when executed by the one or more hardware processors, causes the system to perform:

receiving a first query;

identifying, from among a set of topic maps for a set of one or more target datasets, a subset of one or more topic maps; wherein each topic map of the subset of one or more topic maps indicates a respective topic of the set of one or more target datasets and a respective plurality of references to a respective plurality of content items of the one or more target datasets that are relevant to the respective topic;

generating a hallucination reduced response from a generative artificial intelligence agent comprising a large language model, wherein generating the hallu- cination reduced response comprises:

generating a prompt for the large language model, wherein the prompt comprises:

a second query; wherein the second query is the first query or is generated based on the first query;

the respective plurality of references to the respec- tive plurality of content items of each topic map of the subset of one or more topic maps; and instructions for the generative artificial intelli- gence agent to generate an answer to the second query using information from the content items referred to be the respective plurality of refer- ences;

transmitting the prompt to the generative artificial intelligence agent;

receiving a set of one or more results for the second query; and storing the set of one or more results for the second query.

16. The system of claim 15, wherein identifying the subset of one or more topic maps comprises:

generating a vector representation of the second query;

comparing the vector representation of the second query to one or more respective vector representations of each topic map in the subset of one or more topic maps; and selecting the subset of one or more topic maps based on one or more similarity measures for the vector repre- sentation of the second query and the one or more respective vector representations of each topic map in the subset of one or more topic maps.

17. The system of claim 15, wherein the set of topic maps is generated by performing:

analyzing content of the set of one or more target datasets to identify a plurality of topics;

for each topic of the plurality of topics:

generating a topic description based on content items in the set of one or more target datasets that are relevant to the topic;

identifying a set of references to content items in the set of one or more target datasets that are relevant to the topic; and creating a topic map comprising the topic, the topic description, and the set of references; and wherein the set of topic maps comprises the topic maps created for the plurality of topics.

18. The system of claim 15, wherein:

each topic map of the subset of topic maps comprises, for each reference of the respective plurality of references to the respective plurality of content items, a corre- sponding relevance score indicating a degree of rel- evance of the referenced content item to the respective topic of the topic map;

transmitting the prompt to the generative artificial intel- ligence agent comprises transmitting the corresponding relevance scores associated with the respective plural- ity of references; and the computer-executable instructions, when executed, fur- ther cause the system to perform:

instructing the generative artificial intelligence agent to consider the corresponding relevance scores when generating the answer to the second query.

19. The system of claim 15, wherein the instructions for the generative artificial intelligence agent to generate the answer to the second query use only information from the content items referred to by the respective plurality of references.

20. The system of claim 15, wherein the instructions for the generative artificial intelligence agent to generate the answer to the second query use mostly information from the content items referred to by the respective plurality of references.

* * * * *